United States Patent
Kim et al.

(10) Patent No.: US 9,338,443 B2
(45) Date of Patent: May 10, 2016

(54) METHOD OF DISPLAYING A THREE DIMENSIONAL STEREOSCOPIC IMAGE AND A DISPLAY APPARATUS FOR PERFORMING THE METHOD

(75) Inventors: Kwan-Ho Kim, Asan-si (KR); Seon-Ki Kim, Anyang-si (KR); Tae-Ho Kim, Gimhae-si (KR); Seong-Nam Lee, Seoul (KR); Jung-Hun Lee, Seoul (KR); Jae-Woo Jung, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 464 days.

(21) Appl. No.: 13/571,474

(22) Filed: Aug. 10, 2012

(65) Prior Publication Data

US 2013/0241922 A1 Sep. 19, 2013

(30) Foreign Application Priority Data

Mar. 19, 2012 (KR) .................. 10-2012-0027952

(51) Int. Cl.
*H04N 13/04* (2006.01)
*G02B 27/22* (2006.01)
*G09G 3/00* (2006.01)
*G02B 27/00* (2006.01)

(52) U.S. Cl.
CPC ........ *H04N 13/0409* (2013.01); *G02B 27/2214* (2013.01); *G09G 3/003* (2013.01); *G02B 27/0093* (2013.01); *G02B 27/2264* (2013.01); *G09G 2300/0452* (2013.01); *H04N 2213/001* (2013.01)

(58) Field of Classification Search
CPC .......... H04N 13/0409; H04N 13/0445; H04N 13/0411; H04N 13/0468; H04N 13/00; H04N 13/0413; H04N 13/0447; H04N 19/597; G02B 27/2214; G02B 27/22; G02F 2203/62
See application file for complete search history.

(56) References Cited

U.S. PATENT DOCUMENTS

| 6,055,103 | A  | * | 4/2000 | Woodgate | G02B 5/3016 348/E13.022 |
| 6,437,915 | B2 | * | 8/2002 | Moseley | 348/51 |
| 6,573,928 | B1 | * | 6/2003 | Jones | G02B 27/2214 345/690 |
| 6,703,989 | B1 | * | 3/2004 | Harrold | G02B 27/2214 345/32 |
| 7,619,815 | B2 | * | 11/2009 | Nam | H04N 13/0409 348/51 |
| 8,072,484 | B2 | * | 12/2011 | Saishu | G02B 27/2214 348/46 |

(Continued)

FOREIGN PATENT DOCUMENTS

KR 1020070023849 A 3/2007

OTHER PUBLICATIONS

"Microsoft's Cleartype Sets off Debate on Originality", John Markoff, New York Times, Dec. 7, 1998.*

*Primary Examiner* — Y Lee
*Assistant Examiner* — Shadan E Haghani
(74) *Attorney, Agent, or Firm* — F. Chau & Associates, LLC

(57) ABSTRACT

A method of displaying a three-dimensional ("3D") image includes displaying a left-eye image and a right-eye image on a display panel, the display panel including a first sub pixel, a second sub pixel, a third sub pixel and a fourth sub pixel sequentially arranged in a row direction and driving an active barrier panel to form an opening part configured to transmit light and a barrier configured to block light, the active barrier panel including a first barrier electrode, a second barrier electrode, a third barrier electrode and a fourth barrier electrode respectively corresponding to the first, second, third and fourth sub pixels.

20 Claims, 20 Drawing Sheets

(56) References Cited

U.S. PATENT DOCUMENTS

| | | | | |
|---|---|---|---|---|
| 2001/0001566 A1* | 5/2001 | Moseley | G02B 27/2214 | 349/15 |
| 2003/0011728 A1* | 1/2003 | Battersby | G02F 1/133514 | 349/106 |
| 2005/0063029 A1* | 3/2005 | Khazova | G02B 27/2214 | 359/3 |
| 2006/0203336 A1* | 9/2006 | Van Berkel | G02F 1/1333 | 359/462 |
| 2007/0046564 A1* | 3/2007 | Kim | H04N 13/0447 | 345/6 |
| 2007/0086712 A1* | 4/2007 | Shani | G02B 6/0028 | 385/101 |
| 2007/0183015 A1* | 8/2007 | Jacobs | G02F 1/1323 | 359/245 |
| 2008/0191966 A1* | 8/2008 | Van Berkel | G02F 1/133514 | 345/32 |
| 2008/0247042 A1* | 10/2008 | Scwerdtner | H04N 13/0404 | 359/463 |
| 2009/0225243 A1 | 9/2009 | Kim et al. | | |
| 2011/0043715 A1* | 2/2011 | Ohyama | G02B 27/2214 | 349/15 |
| 2011/0170026 A1 | 7/2011 | Lin | | |
| 2011/0234582 A1* | 9/2011 | Daiku | G02B 27/2214 | 345/419 |
| 2013/0077154 A1* | 3/2013 | Popovich | G02F 1/29 | 359/316 |

* cited by examiner

METHOD OF DISPLAYING A THREE DIMENSIONAL STEREOSCOPIC IMAGE AND A DISPLAY APPARATUS FOR PERFORMING THE METHOD

This application claims priority to Korean Patent Application No. 10-2012-0027952, filed on Mar. 19, 2012, the contents of which are herein incorporated by reference in its entirety.

TECHNICAL FIELD

Exemplary embodiments of the present invention relate to a method of displaying a three-dimensional ("3D") image and a display apparatus for performing the method. More particularly, exemplary embodiments of the present invention relate to a method of displaying a 3D image for increasing the display quality of the 3D image and a display apparatus for performing the method.

DISCUSSION OF THE RELATED ART

There is increasing demand for three-dimensional (3D) displays that can display 3D images in various industries, such as games, movies, and the like.

An exemplary type of 3D display apparatuses displays 3D images using an optical phenomenon, e.g., "binocular parallax". A human's two eyes which are spaced apart from each other view an object at different angles, so that two different images are perceived though his left and right eyes by his brain which then creates a 3D image.

3D display apparatuses may be classified into stereoscopic types, which require spectacles to view the 3D image, and auto-stereoscopic types that do not require spectacles to view the 3D image. Some stereoscopic-type 3D displays may be implemented by a passive polarized glasses method or by an active shutter glasses method. When implemented by the passive polarized glasses method, a 3D display may include a polarized filter having different polarized axes for a viewer's two eyes. In the active shutter glasses method, a left-eye frame image and a right-eye frame image are time-divided and periodically displayed, and a pair of glasses is used to sequentially open or close the left-eye shutter and the right-eye shutter in synchronization with left-eye and right-eye periods, respectively.

The auto-stereoscopic types include lens types or barrier types. The lens-type and barrier-type display apparatuses respectively include a lens panel and a barrier panel on the display panel to distribute 3D images displayed on the display panel toward a plurality of viewing positions.

SUMMARY

Exemplary embodiments of the present invention provide a method of displaying a 3D image that can remove or reduce crosstalk and a display apparatus that performs the method.

According to an exemplary embodiment of the invention, there is provided a method of displaying a three-dimensional ("3D") image, the method includes displaying a left-eye image and a right-eye image on a display panel, the display panel including a first sub pixel, a second pixel, a third sub pixel and a fourth sub pixel in sequentially arranged in a row direction and driving an active barrier panel to form an opening part configured to transmit light and a barrier configured to block light, the active barrier panel including a first barrier electrode, a second barrier electrode, a third barrier electrode and a fourth barrier electrode, the first and third barrier electrodes each having a first width and the second and fourth barrier electrodes each having a second width different from the first width, the first and second electrodes disposed in an area corresponding to the first and second sub pixels, the third barrier electrode and the fourth barrier electrode disposed in an area corresponding to the third and fourth sub pixels.

In an exemplary embodiment, the method may include monitoring a position of an observer, providing a first driving signal and a second driving signal to the first to fourth barrier electrodes so that an area of the active barrier panel in which the first to fourth barrier electrodes are disposed is driven. This area forms the opening part or the barrier part and renders the left-eye and right-eye images based on positions of the opening part and the barrier part and displays the rendered images on the first to fourth sub pixels.

In an exemplary embodiment, the opening part and the barrier part may be shifted to the row direction by about ½ or about 3/2 of a pixel period of the sub pixels.

In an exemplary embodiment, when the observer is at a left outer side or a right outer side of the display panel including a first block adjacent to the left outer or right outer side and a second block adjacent to the first block, first to fourth sub pixels in the first block may display the left-eye and right-eye images in a first order, and first to fourth sub pixels in the second block may display the left-eye and right-eye images in a second order different from the first order.

In an exemplary embodiment, the method may include providing the same driving signals to first to fourth barrier electrodes in the first block and first to fourth barrier electrodes in the second block, wherein positions of an opening part and a barrier part corresponding to the first to fourth sub pixels in the first block may be the same or substantially the same as positions of an opening part and a barrier part corresponding to the first to fourth sub pixels in the second block.

In an exemplary embodiment, when the observer is at a left outer side or a right outer side of the display panel which includes a first block adjacent to the left outer or right outer side, a second block adjacent to the first block, a third block adjacent to the second block and a fourth block adjacent to the third block, first to fourth sub pixels in the first block display the left-eye and right-eye images in a first order, first to fourth sub pixels in the second block may display the left-eye and right-eye images in the first order, first to fourth sub pixels in the third block may display the left-eye and right-eye images in a second order different from the first order, and first to fourth sub pixels in the fourth block may display the left-eye and right-eye images in a third order different from the first order.

In an exemplary embodiment, the second order is the same as the third order.

In an exemplary embodiment, the method may include providing first driving signals to first to fourth barrier electrodes in the first block and first to fourth barrier electrodes in the third block, providing second driving signals different from the first driving signals to first to fourth barrier electrodes in the second block, and providing third driving signals different from the first driving signals to first to fourth barrier electrodes in the fourth block.

In an exemplary embodiment, the second driving signals are the same or substantially the same as the third driving signals, wherein positions of an opening part and a barrier part corresponding to the first to fourth sub pixels in the first block are the same or substantially the same as positions of an opening part and a barrier part corresponding to the first to fourth sub pixels in the third block, and positions of an opening part and a barrier part corresponding to the first to fourth sub pixels in the second block may be the same or substantially the same as positions of an opening part and a barrier part corresponding to the first to fourth sub pixels in the fourth block.

According to an exemplary embodiment of the invention, there is provided a display apparatus that includes a display panel including a first sub pixel, a second sub pixel, a third sub pixel and a fourth sub pixel sequentially arranged in a row direction, and an active barrier panel including a first barrier electrode, a second barrier electrode, a third barrier electrode and a fourth barrier electrode, the first and third barrier electrodes each having a first width and the second and fourth barrier electrodes each having a second width different from the first width, the first and second electrodes disposed in an area corresponding to the first and second sub pixels, the third barrier electrode and the fourth barrier electrode disposed in an area corresponding to the third and fourth sub pixels.

In an exemplary embodiment, the first or second width may be three times the second or first width.

In an exemplary embodiment, the active barrier panel may further include a first electrode line connected to the first barrier electrode, a second electrode line connected to the second barrier electrode, a third electrode line connected to the third barrier electrode and a fourth electrode line connected to the fourth barrier electrode.

In an exemplary embodiment, the first and second electrode lines may be respectively adjacent to first end portions of the first and second barrier electrodes, and the third and fourth electrode lines may be respectively adjacent to second end portions of the third and fourth barrier electrodes, wherein the first end portions may be located opposite to the second end portions.

In an exemplary embodiment, the display apparatus may further include a display driving part configured to alternately display the left-eye image and the right-eye image on two sub pixels sequentially arranged in the row direction, and a barrier driving part configured to provide a first driving signal and a second driving signal to the active barrier panel so that an area of the barrier driving part in which the first to fourth barrier electrodes are disposed is driven. The area forms the opening part or the barrier part.

In an exemplary embodiment, the display apparatus may further include a monitoring part configured to monitor a position of an observer.

In an exemplary embodiment, the opening part and barrier part may be shifted to the row direction by about ½ or about 3/2 of a pixel period of the sub pixels.

In an exemplary embodiment, when the observer may be at a left outer side or a right outer side of the display panel which includes a first block adjacent to the left outer or right outer side and a second block adjacent to the first block, the display driving part may display the left-eye and right-eye images on first to fourth sub pixels in the first block in a first order and may display the left-eye and right-eye images in a second order different from the first order.

In an exemplary embodiment, the barrier driving part may provide the same driving signals to first to fourth barrier electrodes in the first block and first to fourth barrier electrodes in the second block, wherein positions of an opening part and a barrier part corresponding to the first to fourth sub pixels in the first block may be the same or substantially the same as positions of an opening part and a barrier part corresponding to the first to fourth sub pixels in the second block.

In an exemplary embodiment, when the observer may be at a left outer side or a right outer side of the display panel which includes a first block adjacent to the left outer or right outer side, a second block adjacent to the first block, a third block adjacent to the second block and a fourth block adjacent to the third block, the display driving part displays the left-eye and right-eye images on first to fourth sub pixels in the first block in a first order, display the left-eye and right-eye images on first to fourth sub pixels in the second block in the first order, display the left-eye and right-eye images on first to fourth sub pixels in the third block in a second order, and display the left-eye and right-eye images on first to fourth sub pixels in the fourth block in a third order.

In an exemplary embodiment, the barrier driving part may provide first driving signals to first to fourth barrier electrodes in the first block and first to fourth barrier electrodes in the third block, provide second driving signals different from the first driving signals to first to fourth barrier electrodes in the second block, and provide third driving signals different from the first driving signals to first to fourth barrier electrodes in the fourth block, wherein positions of an opening part and a barrier part corresponding to the first to fourth sub pixels in the first block may be the same or substantially the same as positions of an opening part and a barrier part corresponding to the first to fourth sub pixels in the third block, and positions of an opening part and a barrier part corresponding to the first to fourth sub pixels in the second block may be the same or substantially the same as positions of an opening part and a barrier part corresponding to the first to fourth sub pixels in the fourth block.

According to the embodiments of the present invention, the transmittance of the barrier parts may be decreased, and the crosstalk may be decreased at the optimum viewing position and the moving viewing position. When the observer is at the outer portion, the display panel and the active barrier panel are driven, with the display panel and the active barrier panel divided into a plurality of blocks in consideration of crosstalk that may occur due to the viewing angle so that the display quality of 3D images may be increased.

BRIEF DESCRIPTION OF THE DRAWINGS

The embodiments of the present invention will become more apparent by the detailed description with reference to the accompanying drawings, in which.

DETAILED DESCRIPTION

Figure 1:
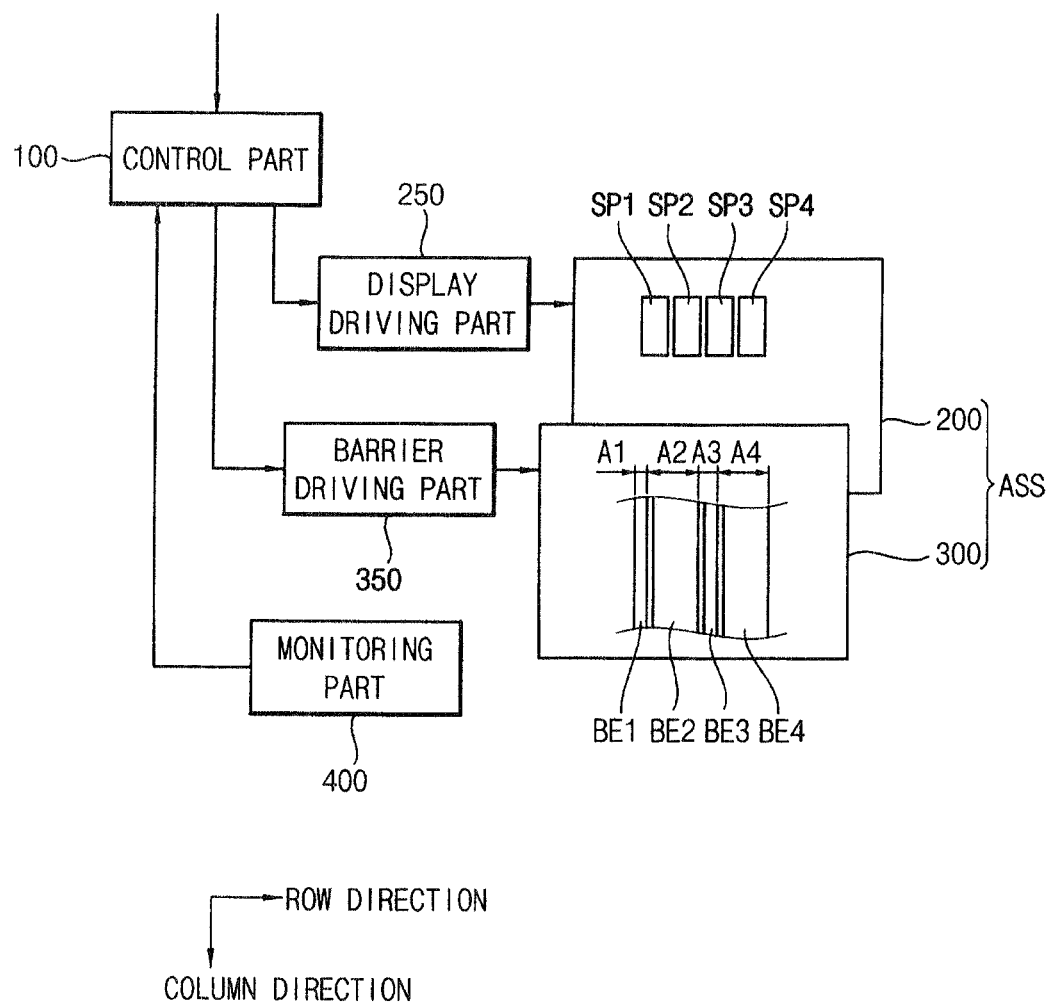
FIG. 1 is a block diagram illustrating a display apparatus according to an embodiment of the present invention.

Hereinafter, the embodiments of the present invention will be described in detail with reference to the accompanying drawings, wherein the same reference numerals or characters may be used to denote the same or similar elements throughout the specification and the drawings. The present invention may be embodied in various different ways and should not be construed as limited to the exemplary embodiments described herein.

It will be understood that when an element or layer is referred to as being "on", "connected to", or "coupled to" another element or layer, it can be directly on, connected or coupled to the other element or layer or intervening elements or layers may be present.

As used herein, the singular forms, "a", "an", and "the" are intended to include the plural forms as well, unless the context clearly indicates otherwise.

As will be appreciated by one skilled in the art, embodiments of the present invention may be embodied as a system, method, computer program product, or a computer program product embodied in one or more computer readable medium(s) having computer readable program code embodied thereon. The computer readable program code may be provided to a processor of a general purpose computer, special purpose computer, or other programmable data processing apparatus. The computer readable medium may be a computer readable signal medium or a computer readable storage medium. The computer readable storage medium may be any tangible medium that can contain, or store a program for use by or in connection with an instruction execution system, apparatus, or device.

FIG. 1 is a block diagram illustrating a display apparatus according to an exemplary embodiment of the invention.

Referring to FIG. 1, the display apparatus includes a control part 100, a display panel 200, a display driving part 250, an active barrier panel 300, a barrier driving part 350 and a monitoring part 400. The display panel 200 and the active barrier panel 300 are collectively referred to as a panel assembly ASS.

The control part 100 receives two-dimensional ("2D") image data and three-dimensional ("3D") image data and controls the display apparatus in a 2D image mode or a 3D image mode based on the received image data.

In the 2D image mode, the control part 100 drives the active barrier panel 300 as a transparent panel which transmits a 2D image displayed on the display panel 200. In the 3D image mode, the control part 100 drives the active barrier panel 300 as a plurality of barrier units which each include an opening part that transmits light and a barrier part that blocks light so that a 3D image may be displayed toward a plurality of viewing positions. In the 3D image mode, the control part 100 renders data of the 3D image displayed on display panel 200 based on driving of the active barrier panel 300.

The display panel 200 includes a plurality of data lines, a plurality of gate lines and a plurality of sub pixels SP. The sub pixels SP are arranged in a matrix type including a plurality of pixel columns and a plurality of pixel rows. Each sub pixel SP includes a switching element connected to a data line and a gate line and a pixel electrode connected to the switching element. The display panel 200 includes a plurality of sub pixels SP1, SP2, SP3 and SP4. The sub pixels includes at least three sub pixels among red, green, blue, yellow, magenta, cyan and white sub pixels.

The display panel 200 alternately displays a left-eye image and a right-eye image every two sub pixels adjacent to each other in a row direction in the 3D image mode. For example, the first and second sub pixels SP1 and SP2 display the left-eye image, and the third and fourth sub pixels SP3 and SP4 displays the right-eye image.

The display driving part 250 provides the display panel 200 with a driving signal under control of the control part 100. For example, according to an embodiment, the display driving part 300 includes a data driving part that provides a data line with a data signal and a gate driving part that provides a gate line with a gate signal.

The active barrier panel 300 includes a plurality of barrier electrodes. The barrier electrodes are extended in a column direction and arranged in the row direction. The barrier electrodes include a first barrier electrode BE1, a second barrier electrode BE2, a third barrier electrode BE3 and a fourth barrier electrode BE4 which are individually driven. Each of the first and third barrier electrodes BE1 and BE3 has a first width corresponding to about ½ of a pixel period p, and each of the second and fourth barrier electrodes BE2 and BE4 has a second width corresponding to about 3/2 of the pixel period p.

The active barrier panel 300 is driven, resulting in a barrier unit which includes a barrier part that blocks light and an opening part that transmits light based on driving signals applied to the first, second, third and fourth barrier electrodes BE1, BE2, BE3 and BE4. The barrier unit has a width corresponding to four sub pixels SP1, SP2, SP3 and SP4 which are sequentially arranged in the row direction. In an observer tracking mode of the 3D image mode, the active barrier panel 300 shift the barrier unit to the row direction by the width corresponding to about ½ or about 3/2 of the pixel period p.

The barrier driving part 350 provides a driving signal with the active barrier panel 300 under control of the control part 100. For example, when a liquid crystal layer included in the active barrier panel 300 is in a normally black mode, a low signal is applied to the barrier electrode corresponding to the barrier part, and a high signal is applied to the barrier electrode corresponding to the opening part. When the liquid crystal layer included in the active barrier panel 300 is in a normally white mode, a high signal is applied to the barrier electrode corresponding to the barrier part, and a low signal is applied to the barrier electrode corresponding to the opening part. The low signal has the same or substantially the same voltage as a common voltage applied to the active barrier panel 300.

The monitoring part 400 monitors a position of an observer, more specifically, for example, the observer's eyes or head. For example, according to an embodiment, the monitoring part 400 includes a camera. The monitoring part 400 provides a monitoring signal corresponding to the observer's position with the control part 100. The control part 100 controls the display panel 200 and the active barrier panel 300 based on the monitoring signal received from the monitoring part 400 in the observer tracking mode.

Figure 2:
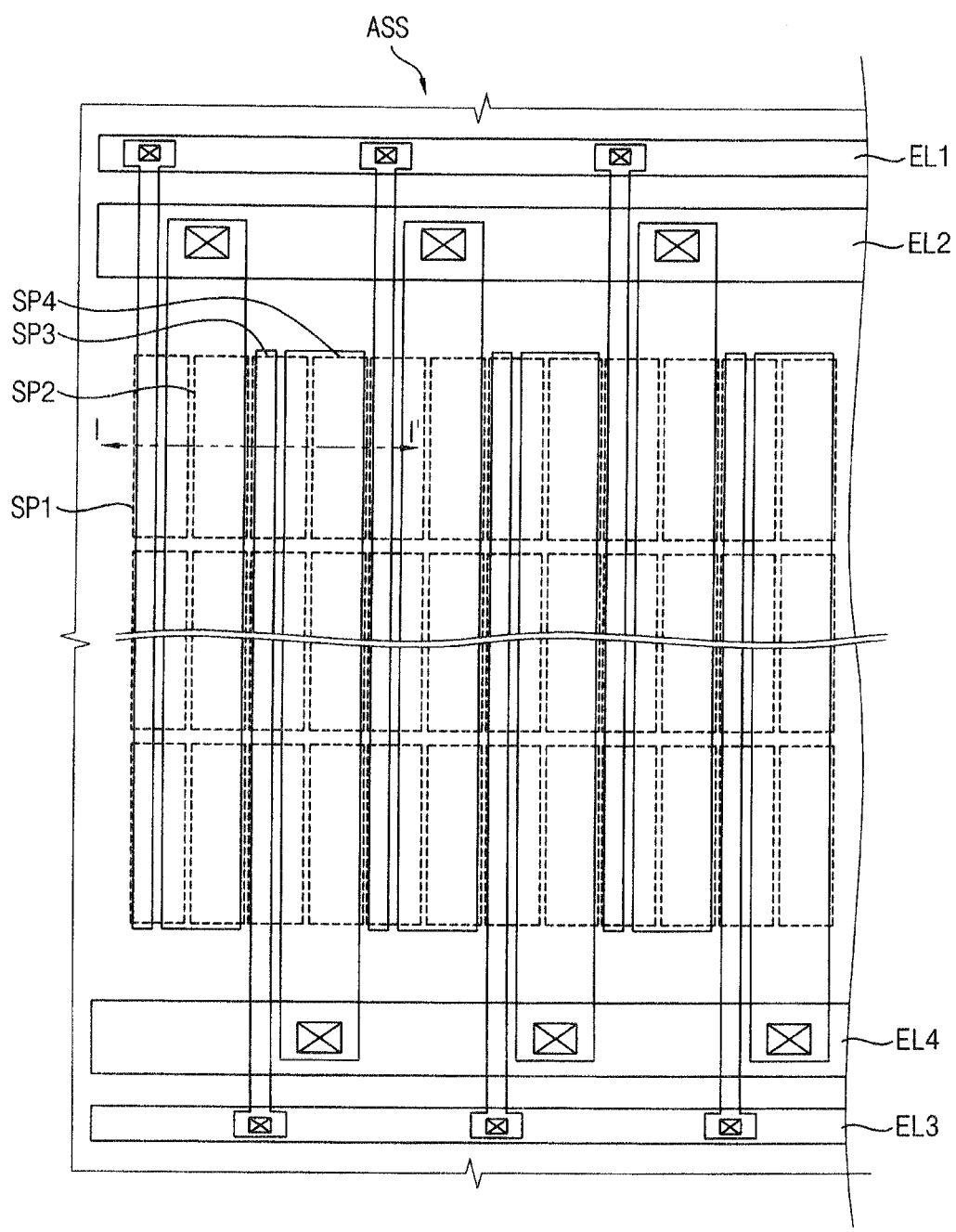
FIG. 2 is a plan view illustrating the active barrier panel in FIG. 1.
Figure 3:
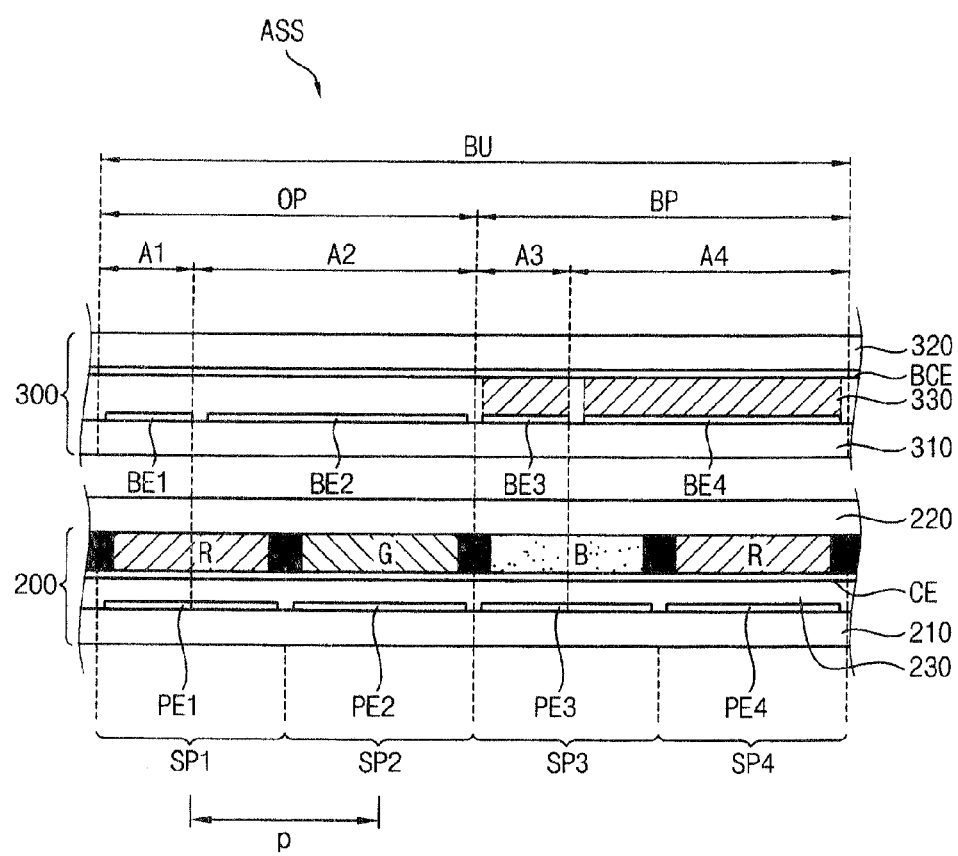
FIG. 3 is a cross-sectional view of the panel assembly taken along line I-I' in FIG. 2.

FIG. 2 is a plan view illustrating the active barrier panel in FIG. 1. FIG. 3 is a cross-sectional view of the panel assembly taken along line in FIG. 2.

Referring to FIGS. 2 and 3, the panel assembly ASS includes the display panel 200 and the active barrier panel 300.

The display panel 200 includes a first display substrate 210, a second display substrate 220 and a first liquid crystal layer 230.

The first display substrate 210 includes pixel electrodes of the sub pixels. For example, the first display substrate 210 includes a first pixel electrode PE1 corresponding to the first sub pixel SP1, a second pixel electrode PE2 corresponding to the second sub pixel SP2, a third pixel electrode PE3 corresponding to the third sub pixel SP3 and a fourth pixel electrode PE4 corresponding to the fourth sub pixel SP4.

The second display substrate 220 is located opposite to the first display substrate 210 and includes a common electrode CE, which is located opposite to the pixel electrodes PE1, PE2, PE3 and PE4, and color filters of the sub pixels SP1, SP2, SP3 and SP4. For example, the second display substrate 220 includes a red filter R corresponding to the first sub pixel SP1, a green filter G corresponding to the second sub pixel SP2, a blue filter B corresponding to the third sub pixel SP3 and the red filter R corresponding to the fourth sub pixel SP4.

The first liquid crystal layer 230 is disposed between the first and second display substrates 210 and 220 and controls transmittance based on driving signals applied to the pixel electrodes PE1, PE2, PE3 and PE4 and the common electrode CE.

The active barrier panel 300 includes a first barrier substrate 310, a second barrier substrate 320 and a second liquid crystal layer 330.

The first barrier substrate 310 includes a plurality of barrier electrodes, and the barrier electrodes are extended in a column direction of the sub pixels and arranged in the row direction of the sub pixels. The barrier electrodes include a first barrier electrode BEL a second barrier electrode BE2, a third barrier electrode BE3 and a fourth barrier electrode BE and are arranged in the row direction every four barrier electrodes, such as the first to fourth barrier electrodes BE1, BE2, BE3 and BE4.

The first barrier substrate 310 includes a first electrode line EL1 connected to the first barrier electrode BE1, a second electrode line EL2 connected to the second barrier electrode BE2, a third electrode line EL3 connected to the third barrier electrode BE3 and a fourth electrode line EL4 connected to the fourth barrier electrode BE4. The first and second electrode lines EL1 and EL2 are disposed in an area adjacent to first end portions of the first and second barrier electrodes BE1 and BE2 in parallel to each other and extended in the row direction. The third and fourth electrode lines EL3 and EL4 are disposed in an area adjacent to second end portions of the third and fourth barrier electrodes BE3 and BE4 in parallel to each other and extended in the row direction. The second end portions are located opposite to the first end portions, respectively.

Each of the first and third barrier electrodes BE1 and BE3 has the first width W1 corresponding to about ½ of the pixel period p, and each of the second and fourth barrier electrodes BE2 and BE4 has the second width W2 corresponding to about 3/2 of the pixel period p. The first barrier electrode BE1 overlaps about a half of the first sub pixel SP1. The second barrier electrode BE2 overlaps at least part of the other half of the first sub pixel SP1 and an entire portion of the second sub pixel SP2. The third barrier electrode BE3 overlaps about a half of the third sub pixel SP3. The fourth barrier electrode BE4 overlaps at least part of the other half portion of the third sub pixel SP3 and an entire portion of the fourth sub pixel SP4.

The second barrier substrate 320 is located opposite to the first barrier substrate 310, and includes the barrier electrodes BE1, BE2, BE3 and BE4 that are located opposite to a barrier common electrode BCE.

The second liquid crystal layer 330 is disposed between the first and second barrier substrates 310 and 320. The second liquid crystal layer 330 transmits or blocks light based on a potential difference of the driving signals applied to the barrier electrodes BE1, BE2, BE3 and BE4 and the barrier common electrode BCE. Thus, the active barrier panel 300 is driven, resulting in the opening part OP that transmits light and the barrier part BP that blocks light.

For example, a first driving signal is applied to the first and second barrier electrodes BE1 and BE2, and a second driving signal is applied to the third and fourth barrier electrodes BE3 and BE4. First and second areas A1 and A2 in which the first and second barrier electrodes BE1 and BE2 are disposed are driven, resulting in the opening part OP that transmits light. Third and fourth areas A3 and A4 in which the third and fourth barrier electrodes BE3 and BE4 are disposed are driven, resulting in the barrier part BP that blocks light. According to the second liquid crystal layer 330 having the normally white mode or normally black mode, the first or second driving signal is applied to the barrier common electrode BCE.

Figure 4:
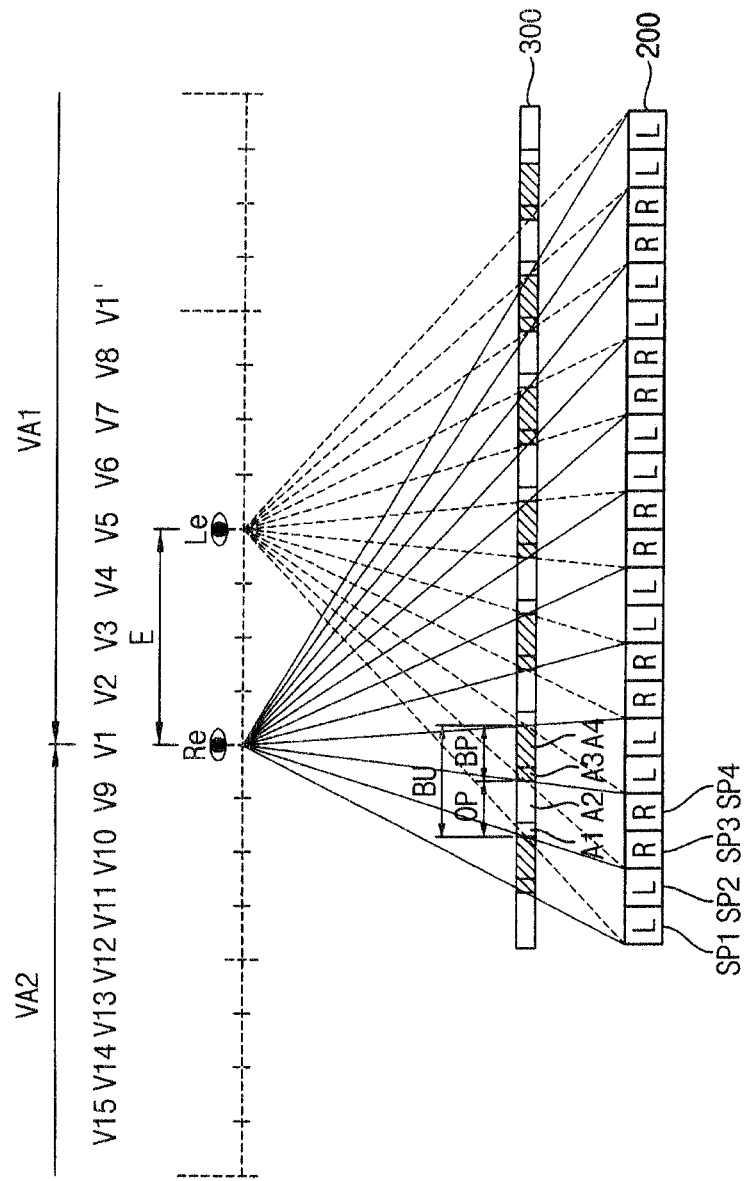
FIG. 4 is a schematic diagram illustrating a method of displaying a 3D image according to the display apparatus in FIG. 1.

FIG. 4 is a schematic diagram illustrating a method of displaying a 3D image according to the display apparatus in FIG. 1.

Referring to FIGS. 3 and 4, in the 3D image mode, the display panel 200 alternately displays a left-eye image L and a right-eye image R every two sub pixels sequentially arranged in a row direction. For example, the first and second sub pixels SP1 and SP2 display the left-eye image L and the third and fourth sub pixels SP3 and SP4 display the right-eye image R.

A first driving signal is applied to the first and second barrier electrodes BE1 and BE2 of the active barrier panel 300 corresponding to the first and second sub pixels SP1 and SP2, so that the first and second areas A1 and A2 in which the first and second barrier electrodes BE1 and BE2 are disposed are driven, resulting in the opening part OP. A second driving signal is applied to the third and fourth barrier electrodes BE3 and BE4 of the active barrier panel 300 corresponding to the third and fourth sub pixels SP3 and SP4, so that the third and fourth areas A3 and A4 in which the third and fourth barrier electrodes BE3 and BE4 are disposed are driven, resulting in the barrier part BP. The active barrier panel 300 is driven, resulting in the barrier unit BU including the opening part OP and the barrier part BP. The barrier unit BU has a width corresponding to four sub pixels.

Therefore, a right-eye Re of the observer sees the right-eye image R displayed on the third and fourth pixels SP3 and SP4, and a left-eye Le of the observer sees the left-eye image L displayed on the first and second sub pixels SP1 and SP2.

The barrier unit BU of the active barrier panel 300 according to an exemplary embodiment has a width corresponding to four sub pixels, and may be shifted to a left side or a right side with respect to a center of the display apparatus, by about ½ or about 3/2 of the pixel period p. According to the shift of the barrier unit BU, the display apparatus has a plurality of viewing positions V1, V2, V3, . . . , V15, where the observer sees the 3D image without crosstalk, in a first viewing area VA1 and a second viewing area VA2.

In the observer tracking mode, the display apparatus according to an exemplary embodiment tracks a position of the observer, shifts the barrier unit BU based on the position of the observer, renders the data of the 3D image corresponding to the sub pixel based on the shifted barrier unit BU and displays the 3D image toward the position of the observer.

Figure 5:
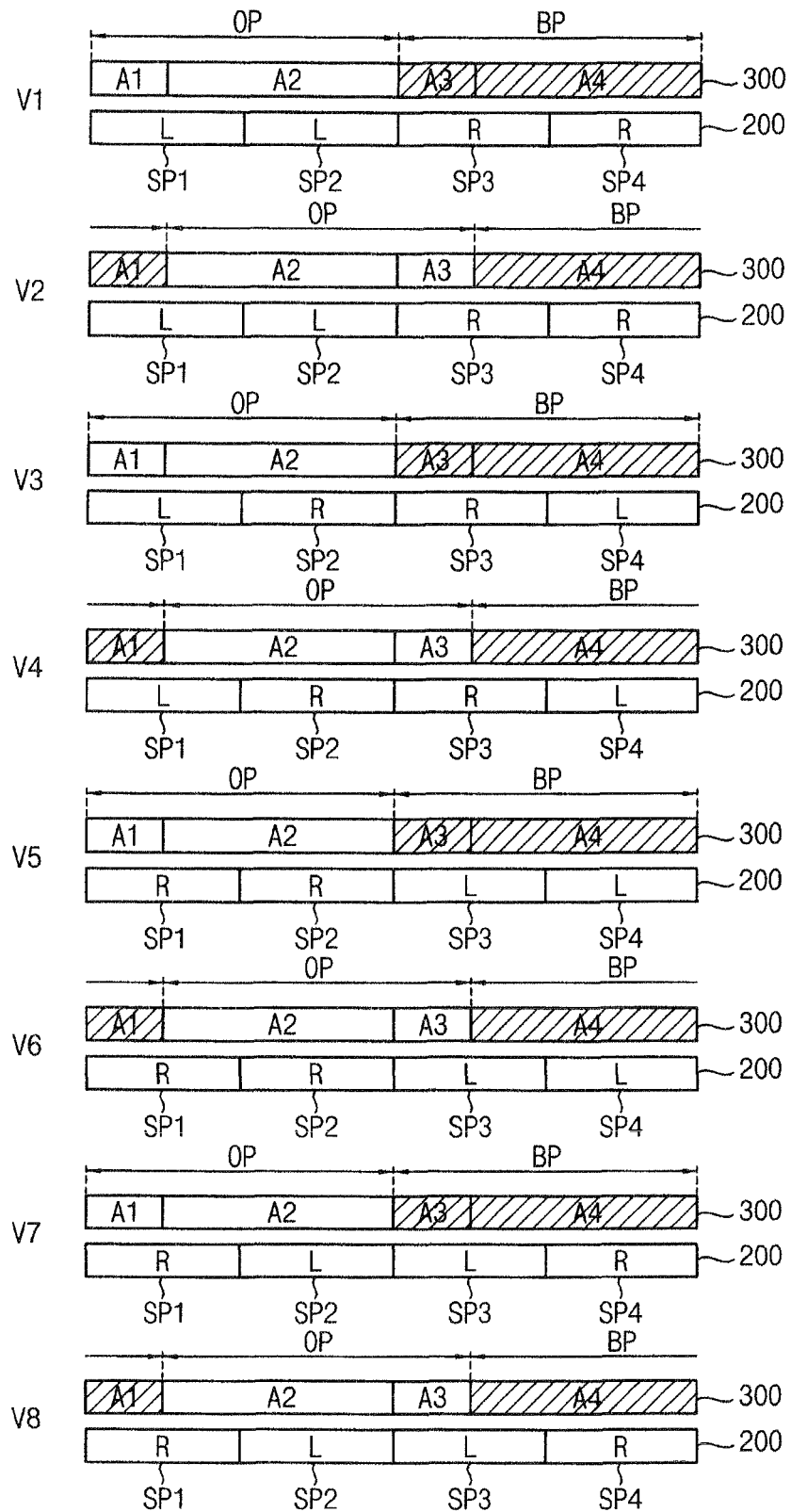
FIG. 5 is a schematic diagram illustrating a method of driving the panel assembly according to a plurality of viewing positions in a first viewing area based on the method of displaying the 3D image described in connection with FIG. 4.

FIG. 5 is a schematic diagram illustrating a method of driving the panel assembly according to a plurality of viewing positions in a first viewing area based on the method of displaying the 3D image described in connection with FIG. 4.

Referring to FIGS. 4 and 5, in the observer tracking mode, when the right-eye Re of the observer is at a first viewing position V1, the display panel 200 and the active barrier panel 300 are driven as described in connection with FIG. 4.

The right-eye Re of the observer which is at the first viewing position V1 sees the right-eye image R. The left-eye Le of the observer which is at a fifth viewing position V5 sees the left-eye image L. A difference in distance between the first and fifth views V1 and V5 is the same or substantially the same as a distance between the right-eye Re and the left-eye Le.

Figure 6:
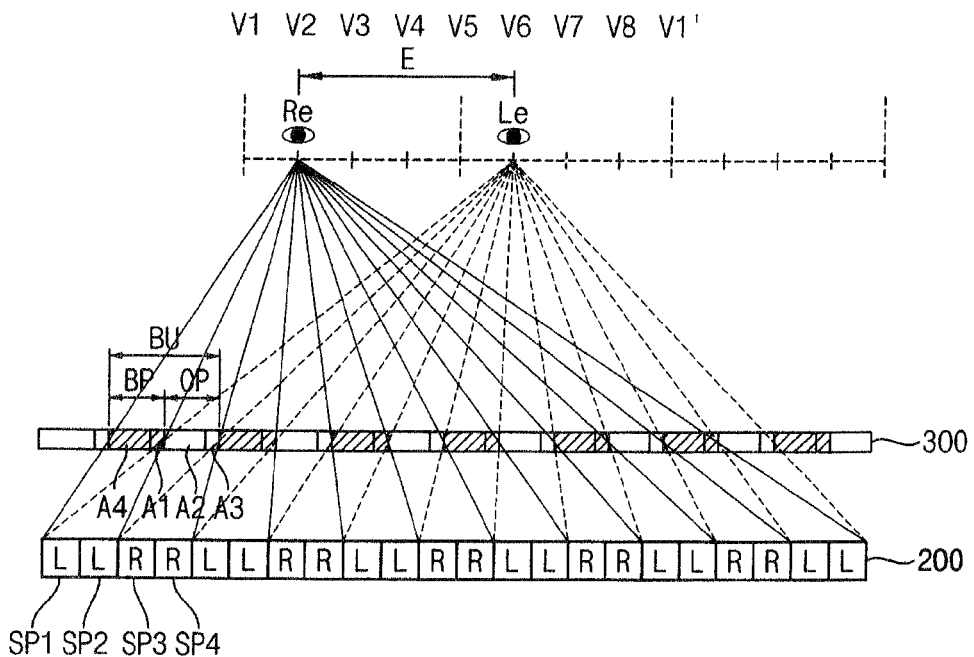
FIG. 6 is a schematic diagram illustrating the method of driving the panel assembly corresponding to a second viewing position in FIG. 5.

FIG. 6 is a schematic diagram illustrating the method of driving the panel assembly corresponding to a second viewing position in FIG. 5.

Referring to FIGS. 3, 5 and 6, when the right-eye Re of the observer is at a second viewing position V2, the first and second sub pixels SP1 and SP2 of the display panel 200 display the left-eye image L, and the third and fourth sub pixels SP3 and SP4 of the display panel 200 display the right-eye image R.

In the active barrier panel 300, a first driving signal is applied to the second and third barrier electrodes BE2 and BE3 so that second and third areas A2 and A3 in which the second and third barrier electrodes BE2 and BE3 are disposed are driven, resulting in the opening part OP. A second driving signal is applied to the fourth and first barrier electrodes BE4 and BE1 so that fourth and first areas A4 and A1 in which the fourth and first barrier electrodes BE4 and BE1 are disposed are driven, resulting in the barrier part BP.

Therefore, the right-eye Re of the observer which is at the second viewing position V2 sees the right-eye image R displayed on the third and fourth pixels SP3 and SP4, and the left-eye Le of the observer sees the left-eye image L displayed on the first and second sub pixels SP1 and SP2.

Figure 7:
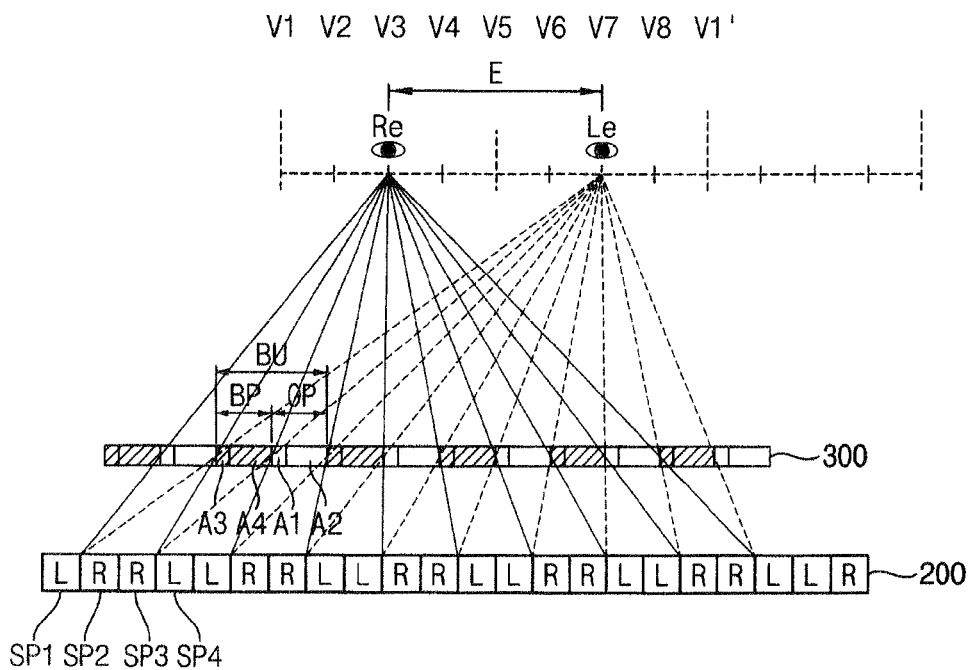
FIG. 7 is a schematic diagram illustrating the method of driving the panel assembly corresponding to a third viewing position in FIG. 5.

FIG. 7 is a schematic diagram illustrating the method of driving the panel assembly corresponding to a third viewing position in FIG. 5.

Referring to FIGS. 3, 5 and 7, when the right-eye Re of the observer is at a third viewing position V3, the first and fourth sub pixels SP1 and SP4 of the display panel 200 display the left-eye image L, and the second and third sub pixels SP2 and SP3 of the display panel 200 display the right-eye image R.

In the active barrier panel 300, the first driving signal is applied to the first and second barrier electrodes BE1 and BE2 so that the first and second areas A1 and A2 in which the first and second barrier electrodes BE1 and BE2 are disposed are driven, resulting in the opening part OP. The second driving signal is applied to the third and fourth barrier electrodes BE3 and BE4 so that the third and fourth areas A3 and A4 in which the third and fourth barrier electrodes BE3 and BE4 are disposed are driven, resulting in the barrier part BP.

Therefore, the right-eye Re of the observer which is at the third viewing position V3 sees the right-eye image R displayed on the second and third pixels SP2 and SP3, and the left-eye Le of the observer sees the left-eye image L displayed on the first and fourth sub pixels SP1 and SP4.

As described in FIG. 5, when the right-eye Re of the observer is at a fourth viewing position V4, the first and fourth sub pixels SP1 and SP4 of the display panel 200 display the left-eye image L and the second and third sub pixels SP2 and SP3 of the display panel 200 display the right-eye image R.

In the active barrier panel 300, the first driving signal is applied to the second and third barrier electrodes BE2 and BE3 so that the second and third areas A2 and A3 in which the second and third barrier electrodes BE2 and BE3 are disposed are driven, resulting in the opening part OP. The second driving signal is applied to the fourth and first barrier electrodes BE4 and BE1 so that fourth and first areas A4 and A1 in which the fourth and first barrier electrodes BE4 and BE1 are disposed are driven, resulting in the barrier part BP.

Therefore, the right-eye Re of the observer which is at the fourth viewing position V4 sees the right-eye image R displayed on the second and third pixels SP2 and SP3, and the left-eye Le of the observer sees the left-eye image L displayed on the first and fourth sub pixels SP1 and SP4.

When the right-eye Re of the observer is at a fifth viewing position V5, the first and second sub pixels SP1 and SP2 of the display panel 200 display the right-eye image R and the third and fourth sub pixels SP3 and SP4 of the display panel 200 display the left-eye image L.

In the active barrier panel 300, the first driving signal is applied to the first and second barrier electrodes BE1 and BE2 so that the first and second areas A1 and A2 in which the first and second barrier electrodes BE1 and BE2 are disposed are driven, resulting in the opening part OP. The second driving signal is applied to the third and fourth barrier electrodes BE3 and BE4 so that the third and fourth areas A3 and A4 in which the third and fourth barrier electrodes BE3 and BE4 are disposed are driven, resulting in the barrier part BP.

Therefore, the right-eye Re of the observer which is at the fifth viewing position V5 sees the right-eye image R displayed on the first and second pixels SP1 and SP2, and the left-eye Le of the observer sees the left-eye image L displayed on the third and fourth sub pixels SP3 and SP4.

When the right-eye Re of the observer is at a sixth viewing position V6, the first and second sub pixels SP1 and SP2 of the display panel 200 display the right-eye image R and the third and fourth sub pixels SP3 and SP4 of the display panel 200 display the left-eye image L.

In the active barrier panel 300, the first driving signal is applied to the second and third barrier electrodes BE2 and BE3 so that the second and third areas A2 and A3 in which the second and third barrier electrodes BE2 and BE3 are disposed are driven, resulting in the opening part OP. The second driving signal is applied to the fourth and first barrier electrodes BE4 and BE1 so that the fourth and first areas A4 and A1 in which the fourth and first barrier electrodes BE4 and BE1 are disposed are driven, resulting in the barrier part BP.

Therefore, the right-eye Re of the observer which is at the sixth viewing position V6 sees the right-eye image R displayed on the first and second pixels SP1 and SP2, and the left-eye Le of the observer sees the left-eye image L displayed on the third and fourth sub pixels SP3 and SP4.

When the right-eye Re of the observer is at a seventh viewing position V7, the second and third sub pixels SP2 and SP3 of the display panel 200 display the left-eye image L and the first and fourth sub pixels SP1 and SP4 of the display panel 200 display the right-eye image R.

In the active barrier panel 300, the first driving signal is applied to the first and second barrier electrodes BE1 and BE2 so that the first and second areas A1 and A2 in which the first and second barrier electrodes BE1 and BE2 are disposed are driven, resulting in the opening part OP. The second driving signal is applied to the third and fourth barrier electrodes BE3 and BE4 so that the third and fourth areas A3 and A4 in which the third and fourth barrier electrodes BE3 and BE4 are disposed are driven, resulting in the barrier part BP.

Therefore, the right-eye Re of the observer which is at the seventh viewing position V7 sees the right-eye image R displayed on the first and fourth pixels SP1 and SP4, and the left-eye Le of the observer sees the left-eye image L displayed on the second and third sub pixels SP2 and SP3.

Figure 8:
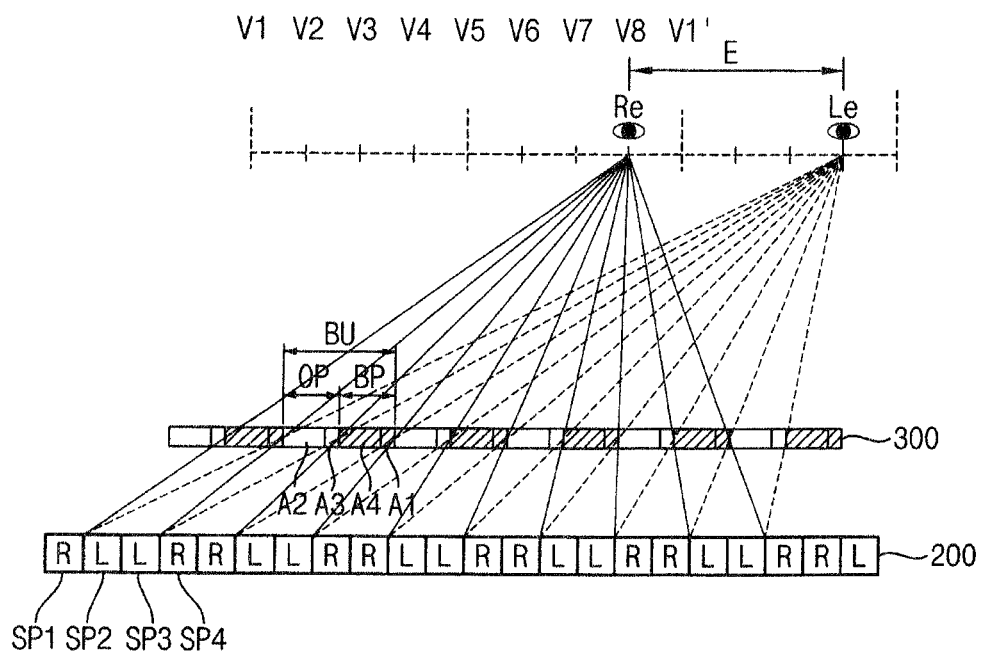
FIG. 8 is a schematic diagram illustrating the method of driving the panel assembly corresponding to an eighth viewing position in FIG. 5.

FIG. 8 is a schematic diagram illustrating the method of driving the panel assembly corresponding to an eighth viewing position in FIG. 5.

Referring to FIGS. 3, 5 and 8, when the right-eye Re of the observer is at an eighth viewing position V8, the second and third sub pixels SP2 and SP3 of the display panel 200 display the left-eye image L and the first and fourth sub pixels SP1 and SP4 of the display panel 200 display the right-eye image R.

In the active barrier panel 300, the first driving signal is applied to the second and third barrier electrodes BE2 and BE3 so that the second and third areas A2 and A3 in which the second and third barrier electrodes BE2 and BE3 are disposed are driven, resulting in the opening part OP. The second driving signal is applied to the fourth and first barrier electrodes BE4 and BE1 so that the fourth and first areas A4 and A1 in which the fourth and first barrier electrodes BE4 and BE1 are disposed are driven, resulting in the barrier part BP.

Therefore, the right-eye Re of the observer which is at the eighth viewing position V8 sees the right-eye image R displayed on the first and fourth pixels SP1 and SP4, and the left-eye Le of the observer sees the left-eye image L displayed on the second and third sub pixels SP2 and SP3.

Figure 9:
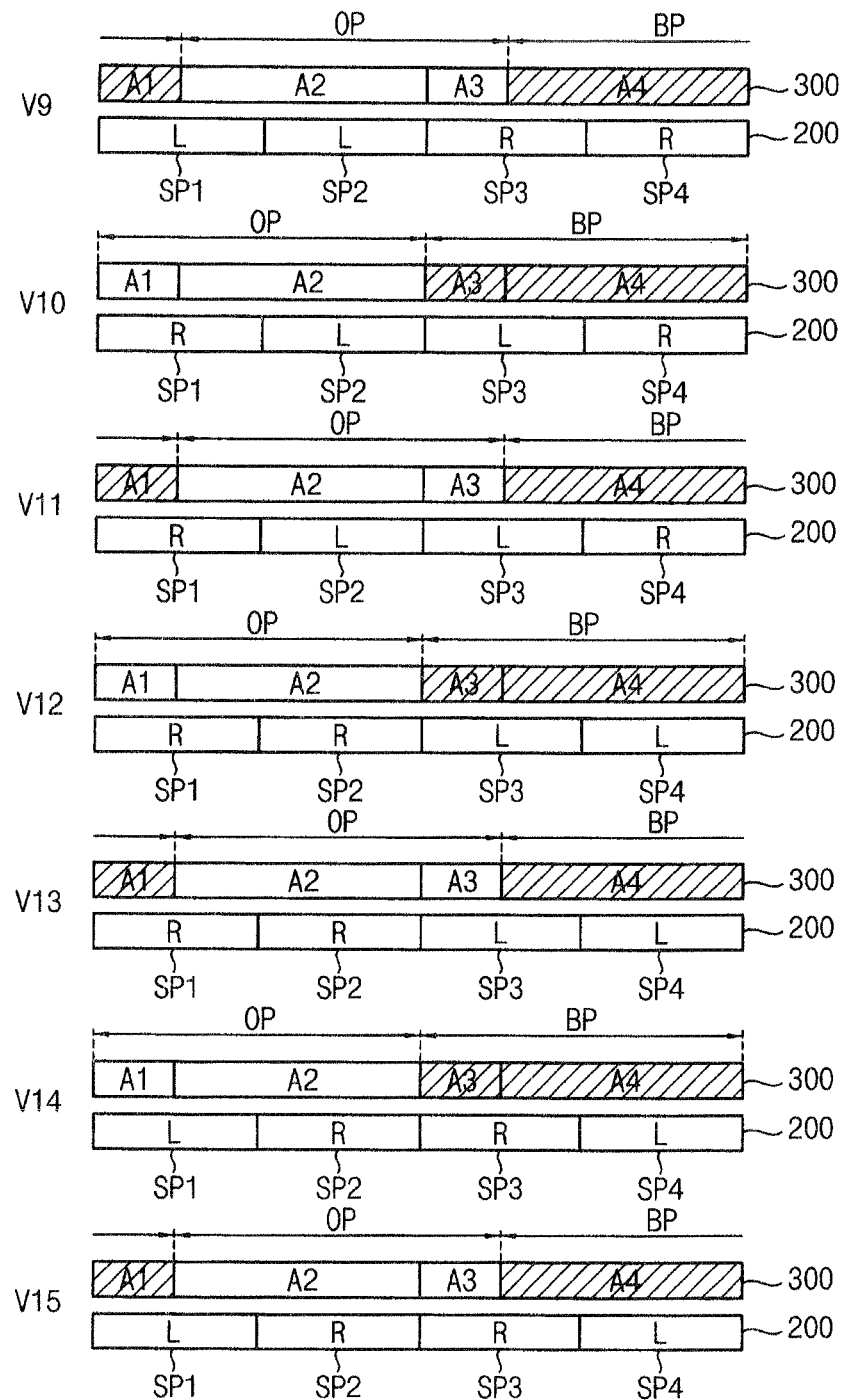
FIG. 9 is a schematic diagram illustrating a method of driving the panel assembly according to a plurality of viewing positions in a second viewing area based on the method of displaying the 3D image in FIG. 4.

FIG. 9 is a schematic diagram illustrating a method of driving the panel assembly according to a plurality of viewing positions in a second viewing area based on the method of displaying the 3D image in FIG. 4.

Referring to FIGS. 4 and 9, in the observer tracking mode, when the right-eye Re of the observer is at a ninth viewing position V9, the first and second sub pixels SP1 and SP2 of the display panel 200 display the left-eye image L, and the third and fourth sub pixels SP3 and SP4 of the display panel 200 display the right-eye image R. In the active barrier panel 300, the second and third areas A2 and A3 in which the second and third barrier electrodes BE2 and BE3 are disposed are driven, resulting in the opening part OP. The first and fourth areas A1 and A4 in which the first and fourth barrier electrodes BE1 and BE4 are disposed are driven, resulting in the barrier part BP.

In the observer tracking mode, when the right-eye Re of the observer is at a tenth viewing position V10, the second and third sub pixels SP2 and SP3 of the display panel 200 display the left-eye image L, and the first and fourth sub pixels SP1 and SP4 of the display panel 200 display the right-eye image R. In the active barrier panel 300, the first and second areas A1 and A2 in which the first and second barrier electrodes BE1 and BE2 are disposed are driven, resulting in the opening part OP. The third and fourth areas A3 and A4 in which the third and fourth barrier electrodes BE3 and BE4 are disposed are driven, resulting in the barrier part BP.

In the observer tracking mode, when the right-eye Re of the observer is at an eleventh viewing position V11, the second and third sub pixels SP2 and SP3 of the display panel 200 display the left-eye image L, and the first and fourth sub pixels SP1 and SP4 of the display panel 200 display the right-eye image R. In the active barrier panel 300, the second and third areas A2 and A3 in which the second and third barrier electrodes BE2 and BE3 are disposed are driven, resulting in the opening part OP. The first and fourth areas A1 and A4 in which the first and fourth barrier electrodes BE1 and BE4 are disposed are driven, resulting in the barrier part BP.

In the observer tracking mode, when the right-eye Re of the observer is at a twelfth viewing position V12, the first and second sub pixels SP1 and SP2 of the display panel 200 display the right-eye image R, and the third and fourth sub pixels SP3 and SP4 of the display panel 200 display the left-eye image L. In the active barrier panel 300, the first and second areas A1 and A2 in which the first and second barrier electrodes BE1 and BE2 are disposed are driven, resulting in the opening part OP. The third and fourth areas A3 and A4 in which the third and fourth barrier electrodes BE3 and BE4 are disposed are driven, resulting in the barrier part BP.

In the observer tracking mode, when the right-eye Re of the observer is at a thirteenth viewing position V13, the first and second sub pixels SP1 and SP2 of the display panel 200 display the right-eye image R, and the third and fourth sub pixels SP3 and SP4 of the display panel 200 display the left-eye image L. In the active barrier panel 300, the second and third areas A2 and A3 in which the second and third barrier electrodes BE2 and BE3 are disposed are driven, resulting in the opening part OP. The first and fourth areas A1 and A4 in which the first and fourth barrier electrodes BE1 and BE4 are disposed are driven, resulting in the barrier part BP.

In the observer tracking mode, when the right-eye Re of the observer is at a fourteenth viewing position V14, the second and third sub pixels SP2 and SP3 of the display panel 200 display the right-eye image R, and the first and fourth pixels SP1 and SP4 of the display panel 200 display the left-eye image L. In the active barrier panel 300, the first and second areas A1 and A2 in which the first and second barrier electrodes BE1 and BE2 are disposed are driven, resulting in the opening part OP. The third and fourth areas A3 and A4 in which the third and fourth barrier electrodes BE3 and BE4 are disposed are driven, resulting in the barrier part BP.

In the observer tracking mode, when the right-eye Re of the observer is at a fifteenth viewing position V15, the second and third sub pixels SP2 and SP3 of the display panel 200 display the right-eye image R, and the first and fourth sub pixels SP1 and SP4 of the display panel 200 display the left-eye image L. In the active barrier panel 300, the second and third areas A2 and A3 in which the second and third barrier electrodes BE2 and BE3 are disposed are driven, resulting in the opening part OP. The first and fourth areas A1 and A4 in which the first and fourth barrier electrodes BE1 and BE4 are disposed are driven, resulting in the barrier part BP.

As described above, the barrier unit of the active barrier panel 300 is shifted based on the viewing position of the observer, and the left-eye or right-eye image displayed on the first to fourth sub pixels SP1, SP2, SP3 and SP4 of the display panel 200 is rendered based on the shifted barrier unit. Thus, the observer can see the 3D image without crosstalk at various viewing positions. However, the embodiments of the present invention are not limited to the above-described data rendering method, and other methods to allow the left and right eyes of the observer to see the left-eye and right-eye images according to the viewing positions of the observer and the shift of the barrier unit may be included in the embodiments of the present invention.

Figure 10:
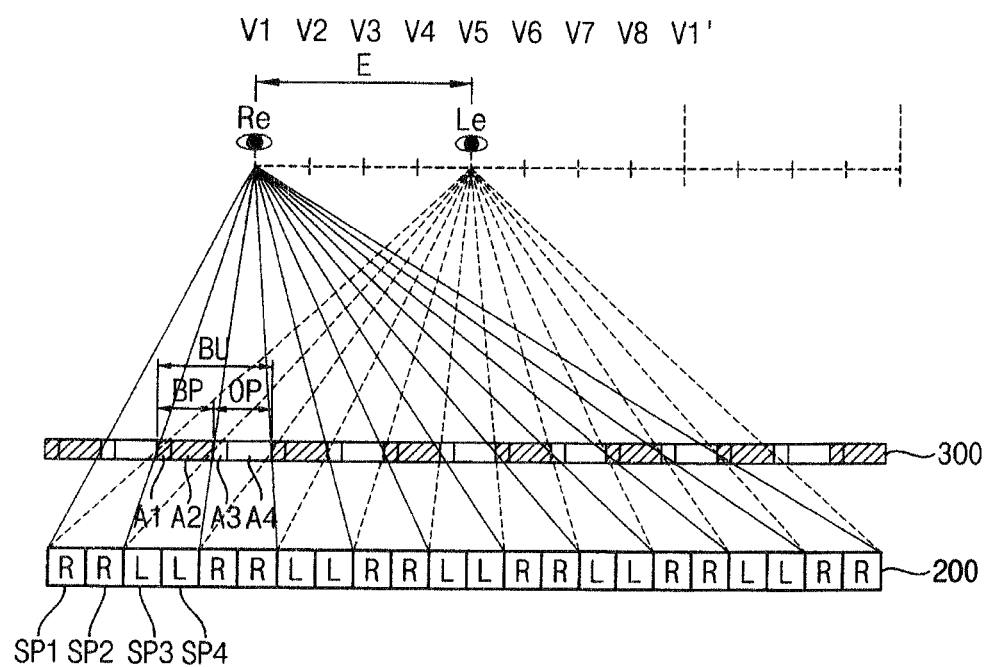
FIG. 10 is a schematic diagram illustrating a method of displaying a 3D image according to an exemplary embodiment of the invention.

FIG. 10 is a schematic diagram illustrating a method of displaying a 3D image according to an exemplary embodiment of the invention.

Referring to FIGS. 1, 4 and 10, a display apparatus according to an exemplary embodiment includes a display panel 200 and an active barrier panel 300. The display panel 200 and the active barrier panel 300 are driven at a driving frequency that is 2 times higher than a driving frequency used for the display panel described in connection with FIGS. 1 to 9 so that a resolution of a 3D image is the same or substantially equivalent to a resolution of a 2D image.

In the 3D image mode, the control part 100 controls the display driving part 250 and the barrier driving part 350 so that the display panel 200 and the active barrier panel 300 are driven at a driving frequency that is 2 times higher than a driving frequency of the 2D image mode.

For example, during an N-th frame, as shown in FIGS. 3 and 4, the first and second sub pixels SP1 and SP2 display the left-eye image L, and the third and fourth sub pixels SP3 and SP4 display the right-eye image R.

Thus, the first driving signal is applied to the first and second barrier electrodes BE1 and BE2 of the active barrier panel 300 so that the first and second areas A1 and A2 in which the first and second barrier electrodes BE1 and BE2 are disposed are driven, resulting in the opening part OP. The second driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the barrier part BP.

Therefore, the right-eye Re of the observer sees the right-eye image R displayed on the third and fourth pixels SP3 and SP4, and the left-eye Le of the observer sees the left-eye image L displayed on the first and second sub pixels SP1 and SP2.

During an (N+1)-th frame, as shown in FIGS. 3 and 10, the first and second sub pixels SP1 and SP2 display the right-eye image R and third and fourth sub pixels SP3 and SP4 display the left-eye image L.

The second driving signal is applied to the first and second barrier electrodes BE1 and BE2 of the active barrier panel 300 so that the first and second areas A1 and A2 in which the first and second barrier electrodes BE1 and BE2 are disposed are driven, resulting in the barrier part BP. The first driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the opening part OP.

Therefore, the right-eye Re of the observer sees the right-eye image R displayed on the first and second pixels SP1 and SP2, and the left-eye Le of the observer sees the left-eye image L displayed on the third and fourth sub pixels SP3 and SP4.

Referring to FIGS. 4 and 10, the left-eye Le of the observer sees the left-eye image L displayed on the first and second sub pixels SP1 and SP2 during the N-th frame, and displayed on the third and fourth sub pixels SP3 and SP4 during the (N+1)-th frame. At a driving frequency that is two times higher than a driving frequency used for the display panel described in connection with FIGS. 1 to 9, the observer sees the left-eye image L displayed on the first, second, third and fourth sub pixels SP1, SP2, SP3 and SP4 so that the resolution of the left-eye image L may be increased. The right-eye Re of the observer sees the right-eye image R displayed on the third and fourth sub pixels SP3 and SP4 during the N-th frame and sees the right-eye image R displayed on the first and second sub pixels SP1 and SP2 during the (N+1)-th frame. At the driving frequency that is two times higher than a driving frequency used for the display panel described in connection with FIGS. 1 to 9, the observer sees the right-eye image R displayed on the first, second, third and fourth sub pixels SP1, SP2, SP3 and SP4 so that the resolution of the right-eye image R may be increased.

Figure 11:
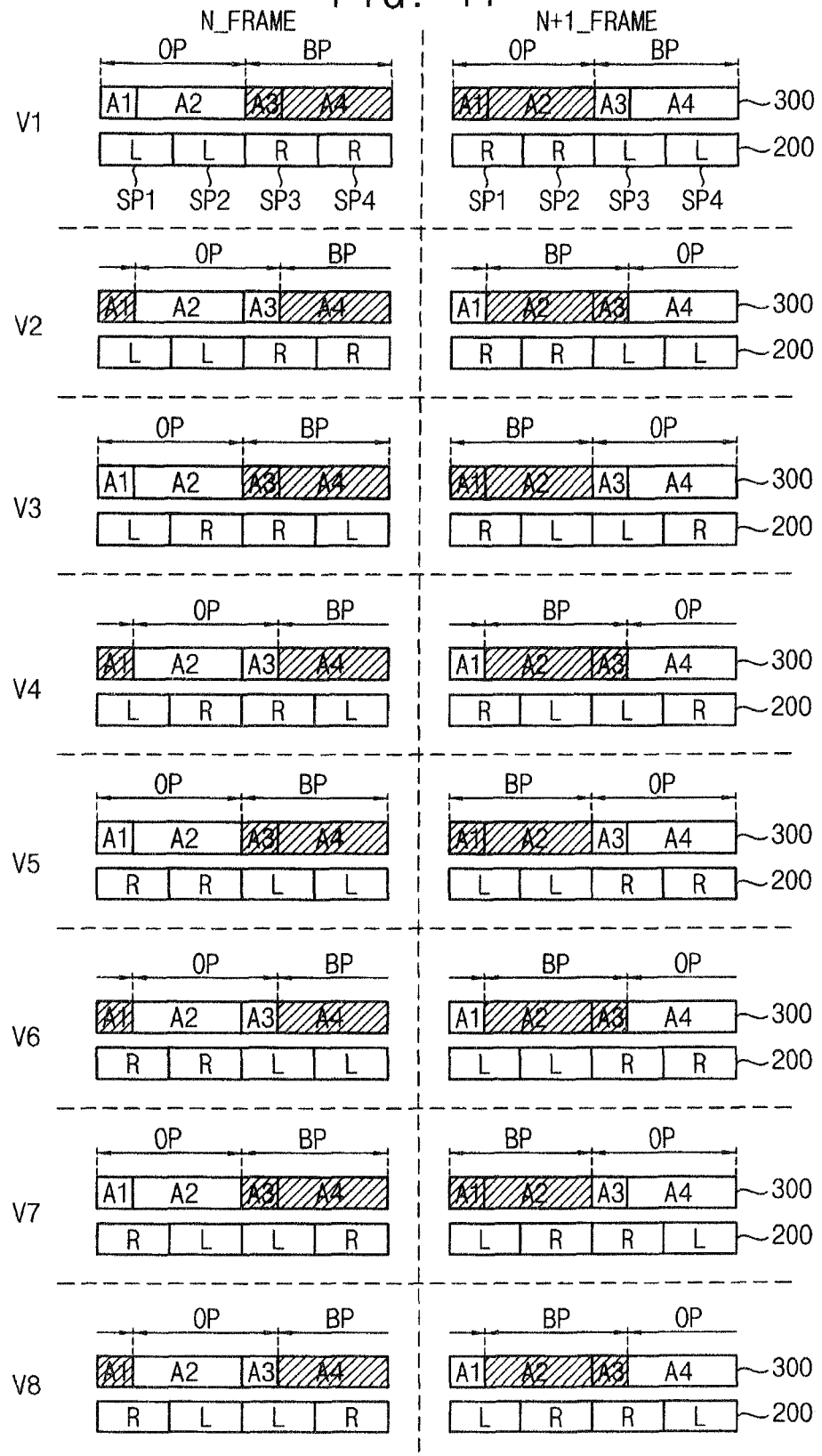
FIG. 11 is a schematic diagram illustrating a method of driving the panel assembly according to a plurality of viewing positions in the first viewing area based on the method of displaying the 3D image in FIG. 10.

FIG. 11 is a schematic diagram illustrating a method of driving the panel assembly according to a plurality of viewing positions in the first viewing area based on the method of displaying the 3D image in FIG. 10.

Referring to FIGS. 4, 10 and 11, in the observer tracking mode, when the right-eye Re of the observer is at a first viewing position V1, the display panel 200 and the active barrier panel 300 are driven by the same or substantially the same method as the driving method described in connection with FIG. 4 during an N-th frame N_FRAME, and the display panel 200 and the active barrier panel 300 are driven by the same or substantially the same method as the driving method described in connection with FIG. 10 during an (N+1)-th frame N+1_FRAME.

Therefore, during the N-th and (N+1)-th frames, the right-eye Re of the observer which is at the first viewing position V1 sees the right-eye image R displayed on the first to fourth sub pixels SP1, . . . , SP4, and the left-eye Le of the observer sees the left-eye image L displayed on the first to fourth sub pixels SP1, . . . , SP4.

Figure 12:
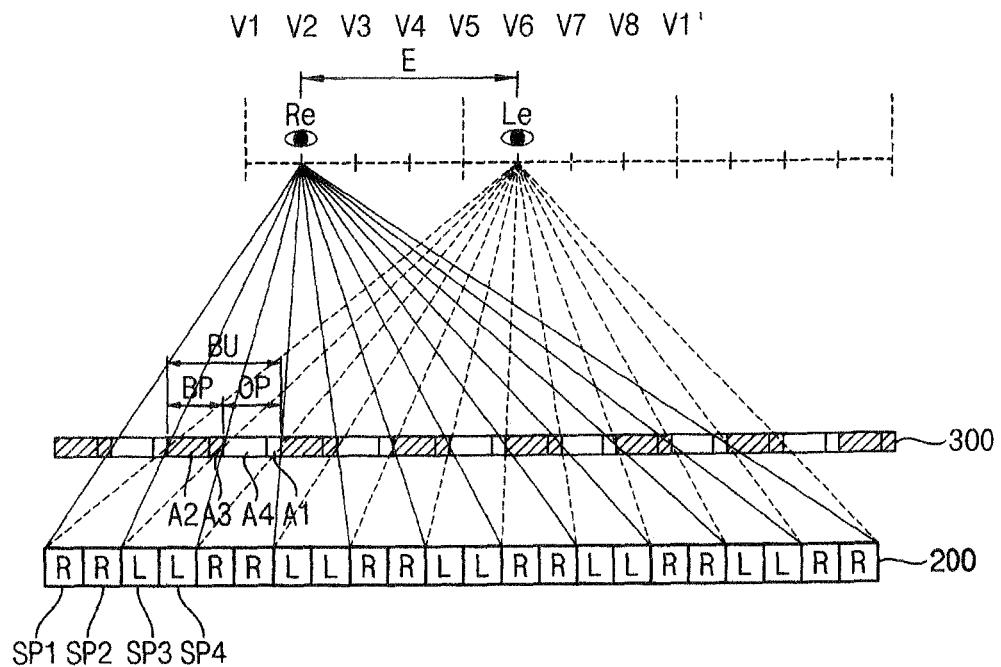
FIG. 12 is a schematic diagram illustrating the method of driving, during the (N+1)-th frame, the panel assembly corresponding to the second viewing position in FIG. 11.

FIG. 12 is a schematic diagram illustrating the method of driving, during the (N+1)-th frame, the panel assembly corresponding to the second viewing position in FIG. 11.

Referring to FIGS. 6, 11 and 12, when the right-eye Re of the observer is at a second viewing position V2, the first and second sub pixels SP1 and SP2 of the display panel 200 display the left-eye image L and the third and fourth sub pixels SP3 and SP4 of the display panel 200 display the right-eye image R during the N-th frame N_FRAME as described in FIG. 6. The first driving signal is applied to the second and third barrier electrodes BE2 and BE3 of the active barrier panel 300 so that the second and third areas A2 and A3 in which the second and third barrier electrodes BE2 and BE3 are disposed are driven, resulting in the opening part OP. The second driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the barrier part BP.

During the (N+1)-th frame N+1_FRAME, as described in FIG. 12, the first and second sub pixels SP1 and SP2 of the display panel 200 display the right-eye image R, and the third and fourth sub pixels SP3 and SP4 of the display panel 200 display the left-eye image L. The second driving signal is applied to the second and third barrier electrodes BE2 and BE3 of the active barrier panel 300 so that the second and third areas A2 and A3 in which the second and third barrier electrodes BE2 and BE3 are disposed are driven, resulting in the barrier part BP. The first driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the opening part OP.

Therefore, during the N-th and (N+1)-th frames, the right-eye Re of the observer which is at the second viewing position V2 sees the right-eye image R displayed on the first to fourth sub pixels SP1, . . . , SP4, and the left-eye Le of the observer sees the left-eye image L displayed on the first to fourth sub pixels SP1, . . . , SP4.

Figure 13:
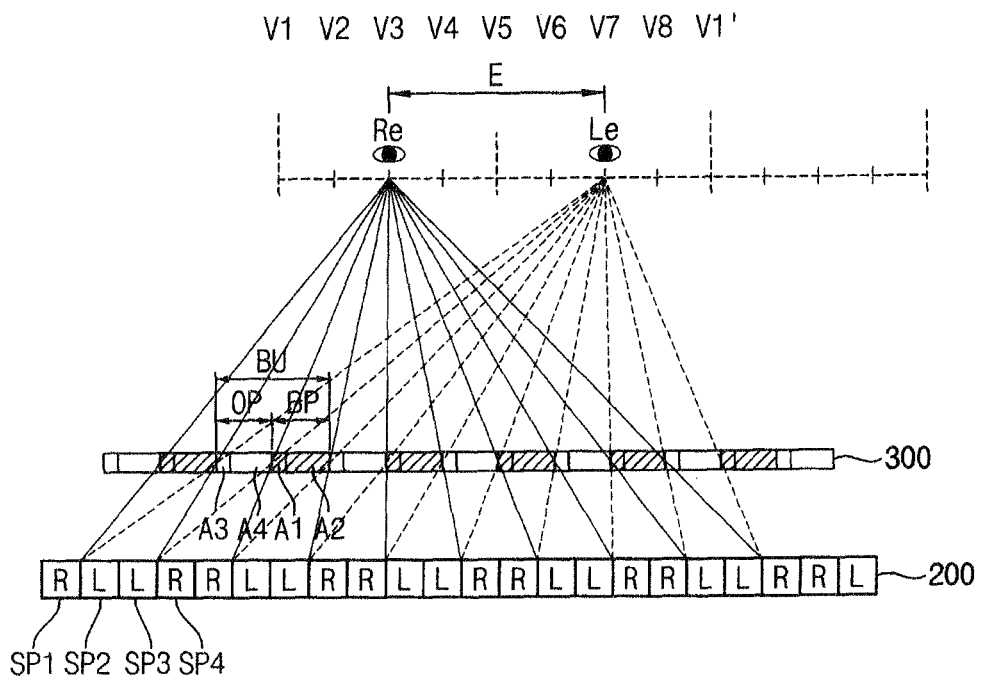
FIG. 13 is a schematic diagram illustrating the method of driving, during the (N+1)-th frame, the panel assembly corresponding to the third viewing position in FIG. 11.

FIG. 13 is a schematic diagram illustrating the method of driving, during the (N+1)-th frame, the panel assembly corresponding to a third viewing position in FIG. 11.

Referring to FIGS. 7, 11 and 13, when the right-eye Re of the observer is at a third viewing position V3, the first and fourth sub pixels SP1 and SP4 of the display panel 200 display the left-eye image L and the second and third sub pixels SP2 and SP3 of the display panel 200 display the right-eye image R during the N-th frame N_FRAME as described in FIG. 7. The first driving signal is applied to the first and second barrier electrodes BE1 and BE2 of the active barrier panel 300 so that the first and second areas A1 and A2 in which the first and second barrier electrodes BE1 and BE2 are disposed are driven, resulting in the opening part OP. The second driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the barrier part BP.

During the (N+1)-th frame N+1_FRAME, as described in FIG. 13, the first and fourth sub pixels SP1 and SP4 of the display panel 200 display the right-eye image R, and the second and third sub pixels SP2 and SP3 of the display panel 200 display the left-eye image L. The second driving signal is applied to the first and second barrier electrodes BE1 and BE2 of the active barrier panel 300 so that the first and second areas A1 and A2 in which the first and second barrier electrodes BE1 and BE2 are disposed are driven, resulting in the barrier part BP. The first driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the opening part OP.

Therefore, during the N-th and (N+1)-th frames, the right-eye Re of the observer which is at the third viewing position V3 sees the right-eye image R displayed on the first to fourth sub pixels SP1, . . . , SP4, and the left-eye Le of the observer sees the left-eye image L displayed on the first to fourth sub pixels SP1, . . . , SP4.

Referring to FIG. 11, when the right-eye Re of the observer is at a fourth viewing position V4, the first and fourth sub pixels SP1 and SP4 of the display panel 200 display the left-eye image L and the second and third sub pixels SP2 and SP3 of the display panel 200 display the right-eye image R during the N-th frame N_FRAME. The first driving signal is applied to the second and third barrier electrodes BE2 and BE3 of the active barrier panel 300 so that the second and third areas A2 and A3 in which the second and third barrier electrodes BE2 and BE3 are disposed are driven, resulting in the opening part OP. The second driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the barrier part BP.

During the (N+1)-th frame N+1_FRAME, the first and fourth sub pixels SP1 and SP4 of the display panel 200 display the right-eye image R, and the second and third sub pixels SP2 and SP3 of the display panel 200 display the left-eye image L. The second driving signal is applied to the second and third barrier electrodes BE2 and BE3 of the active barrier panel 300 so that the second and third areas A2 and A3 in which the second and third barrier electrodes BE2 and BE3 are disposed are driven, resulting in the barrier part BP. The first driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the opening part OP.

Therefore, during the N-th and (N+1)-th frames, the right-eye Re of the observer which is at the fourth viewing position V4 sees the right-eye image R displayed on the first to fourth sub pixels SP1, . . . , SP4, and the left-eye Le of the observer sees the left-eye image L displayed on the first to fourth sub pixels SP1, . . . , SP4.

When the right-eye Re of the observer is at a fifth viewing position V5, the first and second sub pixels SP1 and SP2 of the display panel 200 display the right-eye image R and the third and fourth sub pixels SP3 and SP4 of the display panel 200 display the left-eye image L during the N-th frame N_FRAME. The first driving signal is applied to the first and second barrier electrodes BE1 and BE2 of the active barrier panel 300 so that the first and second areas A1 and A2 in which the first and second barrier electrodes BE1 and BE2 are disposed are driven, resulting in the opening part OP. The second driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the barrier part BP.

During the (N+1)-th frame N+1_FRAME, the first and second sub pixels SP1 and SP2 of the display panel 200 display the left-eye image L, and the third and fourth sub pixels SP3 and SP4 of the display panel 200 display the right-eye image R. The second driving signal is applied to the first and second barrier electrodes BE1 and BE2 of the active barrier panel 300 so that the first and second areas A1 and A2 in which the first and second barrier electrodes BE1 and BE2 are disposed are driven, resulting in the barrier part BP. The first driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the opening part OP.

Therefore, during the N-th and (N+1)-th frames, the right-eye Re of the observer which is at the fifth viewing position V5 sees the right-eye image R displayed on the first to fourth sub pixels SP1, ..., SP4, and the left-eye Le of the observer sees the left-eye image L displayed on the first to fourth sub pixels SP1, ..., SP4.

When the right-eye Re of the observer is at a sixth viewing position V6, the first and second sub pixels SP1 and SP2 of the display panel 200 display the right-eye image R and the third and fourth sub pixels SP3 and SP4 of the display panel 200 display the left-eye image L during the N-th frame N_FRAME. The first driving signal is applied to the second and third barrier electrodes BE2 and BE3 of the active barrier panel 300 so that the second and third areas A2 and A3 in which the second and third barrier electrodes BE2 and BE3 are disposed are driven, resulting in the opening part OP. The second driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the barrier part BP.

During the (N+1)-th frame N+1_FRAME, the first and second sub pixels SP1 and SP2 of the display panel 200 display the left-eye image L, and the third and fourth sub pixels SP3 and SP4 of the display panel 200 display the right-eye image R. The second driving signal is applied to the second and third barrier electrodes BE2 and BE3 of the active barrier panel 300 so that the second and third areas A2 and A3 in which the second and third barrier electrodes BE2 and BE3 are disposed are driven, resulting in the barrier part BP. The first driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the opening part OP.

Therefore, during the N-th and (N+1)-th frames, the right-eye Re of the observer which is at the sixth viewing position V6 sees the right-eye image R displayed on the first to fourth sub pixels SP1, ..., SP4, and the left-eye Le of the observer sees the left-eye image L displayed on the first to fourth sub pixels SP1, ..., SP4.

When the right-eye Re of the observer is at a seventh viewing position V7, the second and third sub pixels SP2 and SP3 of the display panel 200 display the left-eye image L and the first and fourth sub pixels SP1 and SP4 of the display panel 200 display the right-eye image R during the N-th frame N_FRAME. The first driving signal is applied to the first and second barrier electrodes BE1 and BE2 of the active barrier panel 300 so that the first and second areas A1 and A2 in which the first and second barrier electrodes BE1 and BE2 are disposed are driven, resulting in the opening part OP. The second driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the barrier part BP.

During the (N+1)-th frame N+1_FRAME, the second and third sub pixels SP2 and SP3 of the display panel 200 display the right-eye image R, and the first and fourth sub pixels SP1 and SP4 of the display panel 200 display the left-eye image L. The second driving signal is applied to the first and second barrier electrodes BE1 and BE2 of the active barrier panel 300 so that the first and second areas A1 and A2 in which the first and second barrier electrodes BE1 and BE2 are disposed are driven, resulting in the barrier part BP. The first driving signal is applied to the third and fourth barrier electrodes BE3 and BE4 of the active barrier panel 300 so that the third and fourth areas A3 and A4 in which the third and fourth barrier electrodes BE3 and BE4 are disposed are driven, resulting in the opening part OP.

Therefore, during the N-th and (N+1)-th frames, the right-eye Re of the observer which is at the seventh viewing position V7 sees the right-eye image R displayed on the first to fourth sub pixels SP1, ..., SP4, and the left-eye Le of the observer sees the left-eye image L displayed on the first to fourth sub pixels SP1, ..., SP4.

Figure 14:
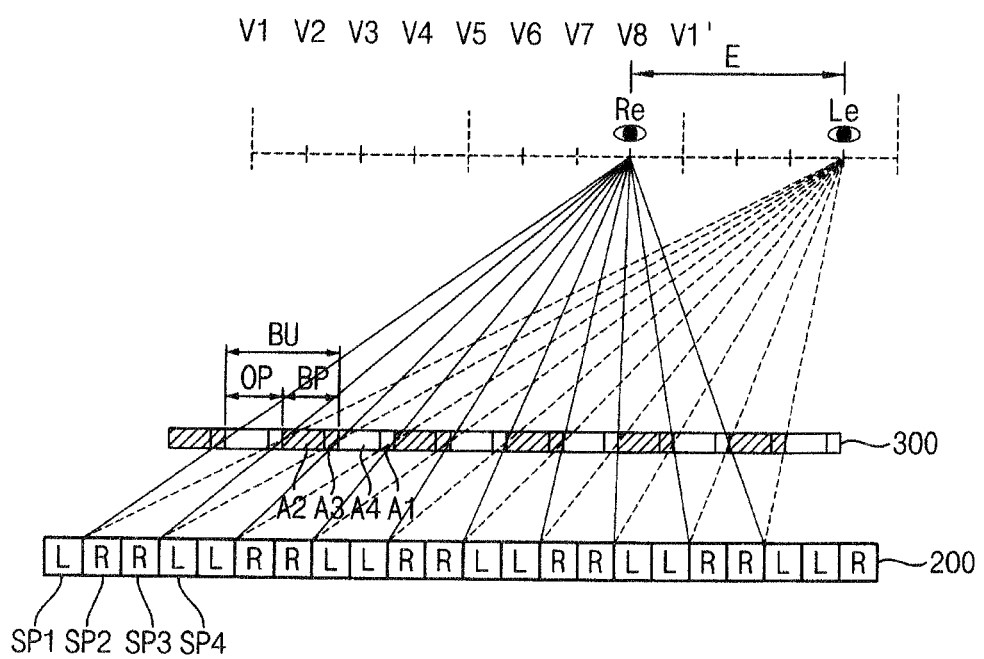
FIG. 14 is a schematic diagram illustrating the method of driving, during the (N+1)-th frame, the panel assembly corresponding to the eighth viewing position in FIG. 11.

FIG. 14 is a schematic diagram illustrating the method of driving, during the (N+1)-th frame, the panel assembly corresponding to an eighth viewing position in FIG. 11.

Referring to FIGS. 8, 11 and 14, when the right-eye Re of the observer is at an eighth viewing position V8, the second and third sub pixels SP2 and SP3 of the display panel 200 display the left-eye image L and the first and fourth sub pixels SP1 and SP4 of the display panel 200 display the right-eye image R during the N-th frame N_FRAME as described in connection with FIG. 8. The first driving signal is applied to the second and third barrier electrodes BE2 and BE3 of the active barrier panel 300 so that the second and third areas A2 and A3 in which the second and third barrier electrodes BE2 and BE3 are disposed are driven, resulting in the opening part OP. The second driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the barrier part BP.

During the (N+1)-th frame N+1_FRAME, as illustrated in FIG. 14, the second and third sub pixels SP2 and SP3 of the display panel 200 display the right-eye image R, and the first and fourth sub pixels SP1 and SP4 of the display panel 200 display the left-eye image L. The second driving signal is applied to the second and third barrier electrodes BE2 and BE3 of the active barrier panel 300 so that the second and third areas A2 and A3 in which the second and third barrier electrodes BE2 and BE3 are disposed are driven, resulting in the barrier part BP. The first driving signal is applied to the fourth and first barrier electrodes BE4 and BE1 of the active barrier panel 300 so that the fourth and first areas A4 and A1 in which the fourth and first barrier electrodes BE4 and BE1 are disposed are driven, resulting in the opening part OP.

As described above, a 3D image which is displayed on the first to fourth sub pixels SP1, SP2, SP3 and SP4 during the N-th frame, is different from a 3D image which is displayed on the first to fourth sub pixels SP1, SP2, SP3 and SP4 during the (N+1)-th frame. In other words, when each of the first to fourth sub pixels SP1, SP2, SP3, and SP4 displays a left-eye image during the Nth frame, the same displays a right-eye image during the (N+1)-th frame, and when each of the first to fourth sub pixels SP1, SP2, SP3, and SP4 displays a right-eye image during the Nth frame, the same displays a left-eye image during the (N+1)-th frame. The opening part OP and the barrier part BP of the active barrier panel 300 during the N-th frame are opposite to the opening part OP and the barrier part BP of the active barrier panel 300 during the (N+1)-th frame. In other words, when part of the active barrier panel 300 operates as an opening part during the Nth frame, the same part of the active barrier panel 300 operates a barrier part during the (N+1)-th frame, and when part of the active barrier panel 300 operates as a barrier part during the Nth frame, the same part of the active barrier panel 300 operates an opening part during the (N+1)-th frame.

According to an embodiment, when the observer is at the viewing positions of the second viewing area VA2 in FIG. 4, the display panel 200 and the active barrier panel 300 are driven by a driving method as described in connection with FIG. 9 during the N-th frame and are driven in a similar manner to driving the display panel 200 and the active barrier panel 300 during the (N+1)-th frame with respect to driving the display panel 200 and the active barrier panel 300 during the Nth frame as described in connection with FIG. 11. Thus, the resolution of 3D images may be the same or substantially the same resolution as 2D images.

Figure 15A:
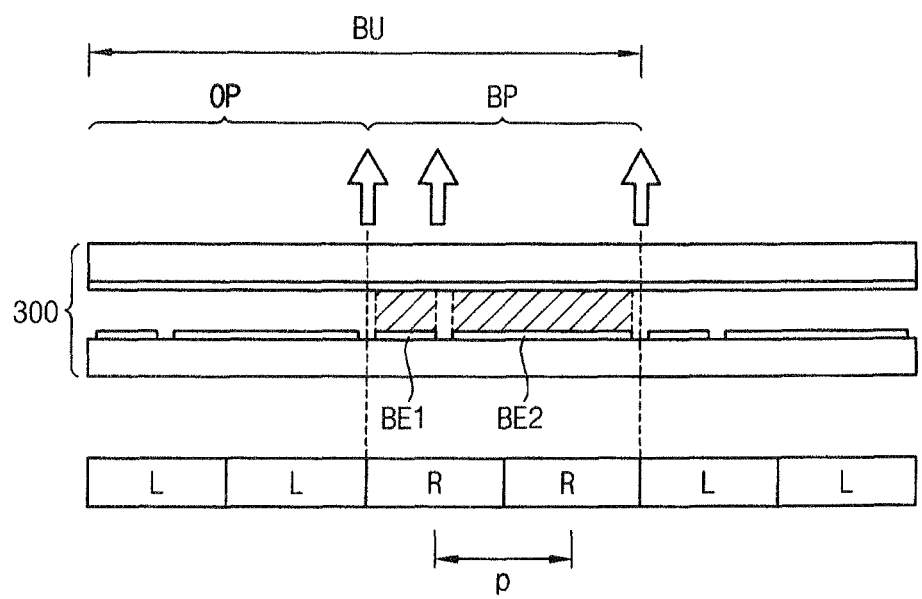
FIGS. 15A and 15B are schematic diagrams illustrating transmittance according to an exemplary embodiment and a comparative example.
Figure 15B:
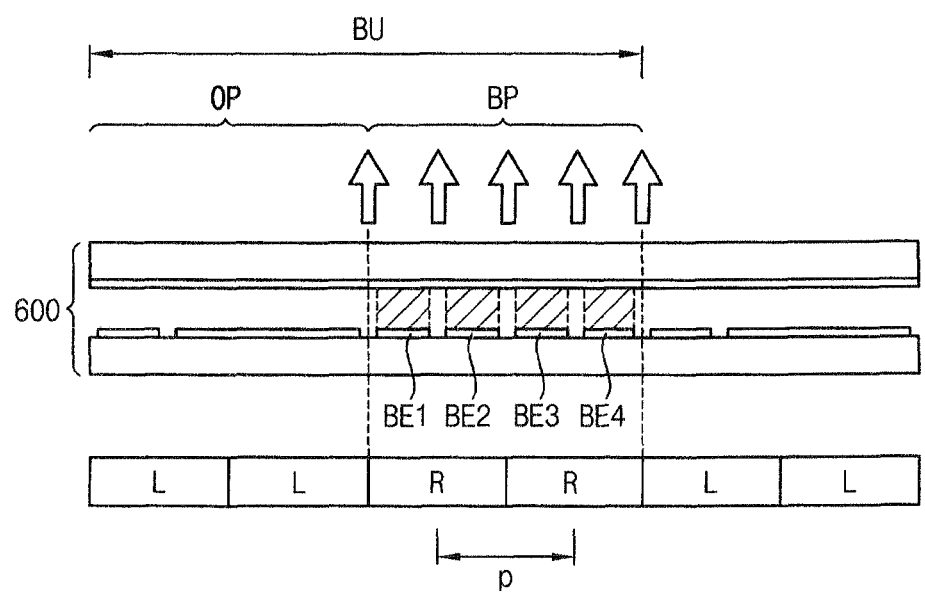

FIGS. 15A and 15B are schematic diagrams for describing transmittance according to an exemplary embodiment and a comparative example. FIG. 15A is a cross-sectional view illustrating a panel assembly according to the exemplary embodiment and FIG. 15B is a cross-sectional view illustrating a panel assembly according to the comparative example.

Referring to FIGS. 15A and 15B, an active barrier panel 300 according to an exemplary embodiment shifts a barrier unit having a width corresponding to 4 sub pixels sequentially arranged in a row direction so that a 3D image is viewed at 8 viewing positions. The active barrier panel 300 according to an exemplary embodiment includes a first barrier electrode BE1 and a second barrier electrode BE2 corresponding to 2 sub pixels. The first barrier electrode BE1 has a width corresponding to about ½ of a pixel period p and the second barrier electrode BE2 has a width corresponding to about 3/2 of the pixel period p. A barrier part BP is formed by the first and second barrier electrodes BE1. Light may leak through an area between the first and second barrier electrodes BE1 and BE2. According to an exemplary embodiment, the barrier unit has a width corresponding to 4 sub pixels, but the width of the barrier unit may vary (e.g., increase or decrease) according to process capability and driving capability of the active barrier panel.

An active barrier panel 600 according to the comparative example shifts a barrier unit having the width corresponding to 4 sub pixels sequentially arranged in the row direction so that a 3D image is viewed at 8 viewing positions. The active barrier panel 600 according to the comparative exemplary embodiment includes first, second, third and fourth barrier electrodes BE1, BE2, BE3 and BE4 corresponding to 2 sub pixels, and each of the first, second, third and fourth barrier electrodes BE1, BE2, BE3 and BE4 has a width corresponding to about ½ of the pixel period p. A barrier part BP is formed by the first, second, third and fourth barrier electrodes BE1, BE2, BE3 and BE4, and light leak through areas between the first, second, third and fourth barrier electrodes BE1, BE2, BE3 and BE4. The exemplary embodiment may exhibit decreased light leakage in comparison with the comparative example.

Table 1 shows data obtained by measuring crosstalk according to the exemplary embodiment and the comparative example.

TABLE 1

|  | comparative example | exemplary embodiment |
|---|---|---|
| barrier transmittance | 7.87% | 3.94% |
| White crosstalk (at optimum viewing position) | 7.30% | 3.79% |
| White crosstalk (at moving viewing position) | 17.97% | 15.34% |

Referring to Table 1, the transmittance of the barrier part according to the comparative example is about 7.87% and the transmittance of the barrier part according to the exemplary embodiment is about 3.94%. The transmittance of the exemplary embodiment is lower than the transmittance of the comparative example.

The white crosstalk at the optimum viewing position according to the comparative example is about 7.30%, and the white crosstalk at the optimum viewing position according to the exemplary embodiment is about 3.79%. The white crosstalk refers to a ratio of a black image included in a white image when a barrier part or an opening part is changed from the black image into the white image. According to an embodiment, the optimum viewing position is at least one of the first to eighth viewing positions V1, ..., V8 as described above. The white crosstalk at the optimum viewing position is lower in the exemplary embodiment than in the comparative example.

Regarding the white crosstalk at the moving viewing position, the comparative example exhibits about 17.97%, and the exemplary embodiment exhibits about 15.34%. According to an embodiment, the moving viewing position is between the first to eighth positions V1, ..., V8. The white crosstalk at the moving viewing position is lower in the exemplary embodiment than in the comparative example.

As described above, according to the exemplary embodiment, the transmittance of the barrier part may be decreased, and the crosstalk may be decreased at the optimum viewing position and the moving viewing position. Therefore, the display quality of the 3D image may be increased.

Figure 16:
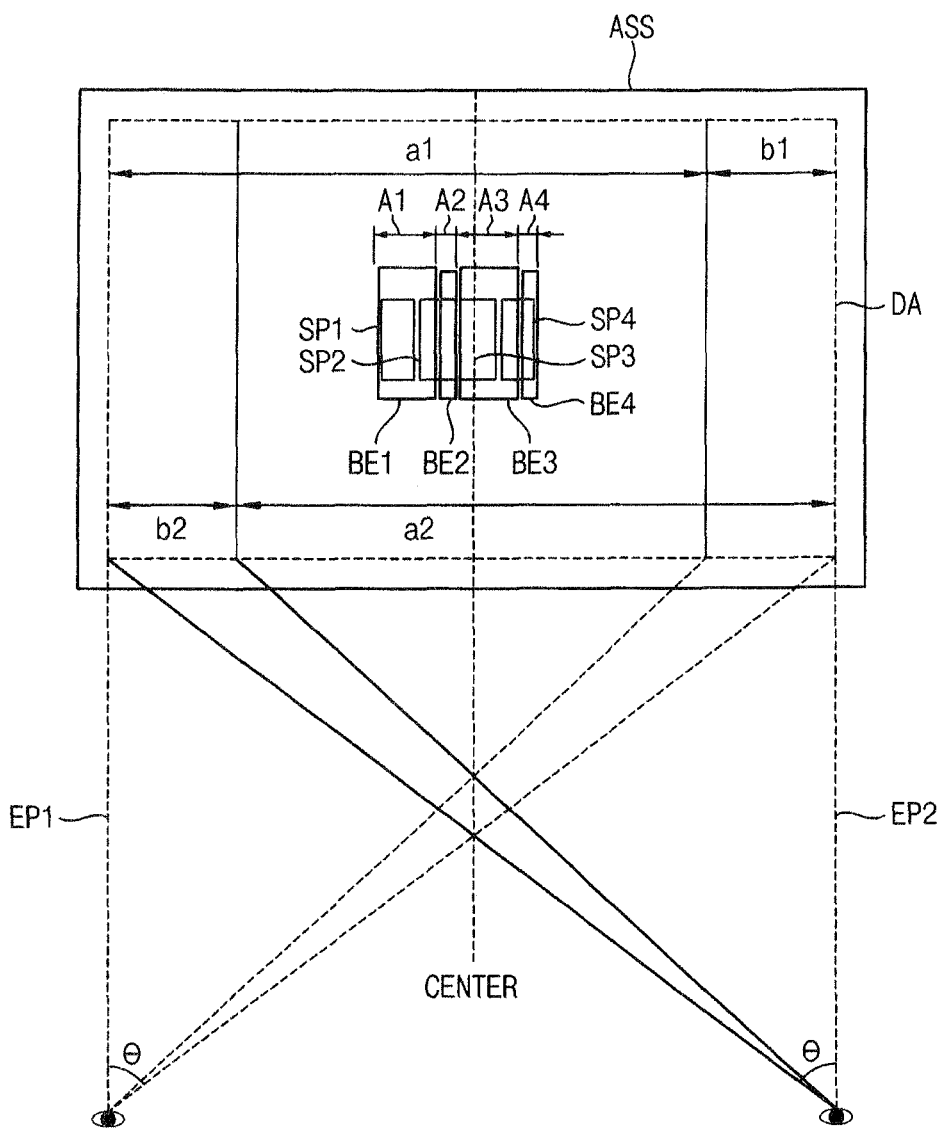
FIG. 16 is a schematic diagram illustrating a method of displaying a 3D image according to an exemplary embodiment of the invention.

FIG. 16 is a schematic diagram illustrating a method of displaying a 3D image according to an exemplary embodiment of the invention.

Referring to FIGS. 1 and 16, a panel assembly ASS includes a display panel 200 and an active barrier panel 300.

The display panel 200 alternately displays a left-eye image and a right-eye image every two sub pixels adjacent to each other in a row direction in the 3D image mode. For example, the first and second sub pixels SP1 and SP2 display the left-eye image, and the third and fourth sub pixels SP3 and SP4 displays the right-eye image.

The display driving part 250 provides a driving signal to the display panel 200 under control of the control part 100. For example, the display driving part 300 include a data driving part providing a data line with a data signal and a gate driving part providing a gate line with a gate signal.

The active barrier panel 300 includes a plurality of barrier electrodes. The barrier electrodes are extended in a column direction and arranged in a row direction. The barrier electrodes include a first barrier electrode BE1, a second barrier electrode BE2, a third barrier electrode BE3 and a fourth barrier electrode BE4 which are individually driven. Each of the first and third barrier electrodes BE1 and BE3 has a first width corresponding to about 3/2 of a pixel period p, and each of the second and fourth barrier electrodes BE2 and BE4 has a second width corresponding to about ½ of the pixel period p.

The active barrier panel 300 is driven, resulting in a barrier unit which includes a barrier part that blocks light and an opening part that transmits light based on driving signals applied to the first to fourth barrier electrodes BE1, BE2, BE3 and BE4. The barrier unit has a width corresponding to four sub pixels SP1, SP2, SP3 and SP4 which are arranged in the row direction. In an observer tracking mode of the 3D image mode, the active barrier panel 300 may shift the barrier unit to the row direction by a width corresponding to about ½ or about 3/2 of the pixel period p.

The barrier driving part 350 provides the active barrier panel 300 with a driving signal under control of the control part 100 so that the active barrier panel 300 is driven, resulting in a plurality of barrier units each including the opening part and the barrier part.

According to an exemplary embodiment, when the observer is at an outer portion of a display area DA substantially displaying an image in the panel assembly ASS, the display driving part 250 and the barrier driving part 350 divide the display area DA of the panel assembly ASS into a first block and a second block and drive the display area DA of the panel assembly ASS, with the display area DA divided into the first and second blocks. According to an embodiment, the first and second blocks are divided based on crosstalk corresponding to a viewing angle of the observer.

For example, when observer is at the outer position of the display area DA, the display area DA of the panel assembly ASS is divided into the first block corresponding to a viewing angle that allows the crosstalk to be decreased and the second block corresponding to a viewing angle that allows the crosstalk to be increased.

The outer portion of the display area DA includes a first outer portion EP1 which is positioned at a left side of the outer portion and a second outer portion EP2 which is positioned at a right side of the outer portion. When the observer is at the first outer portion EP1, the display area DA is divided into a first left block a1 and a second left block b1. The sub pixels and barrier electrodes included in the first and second left blocks a1 and b1 are individually driven so that the crosstalk may be decreased. When the observer is at the second outer portion EP2, the display area DA is divided into a first right block a2 and a second right block b2. The sub pixels and barrier electrodes included in the first and second right blocks a2 and b2 are individually driven so that the crosstalk may be decreased.

As such, when the observer is at the outer portion of the display apparatus, the crosstalk of the 3D image may be decreased so that the display quality of the 3D image may be increased.

Figure 17:
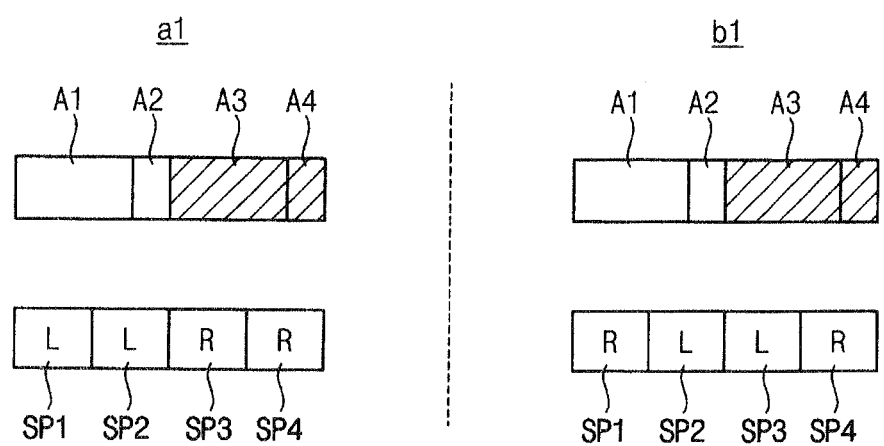
FIG. 17 is a schematic diagram illustrating a method of driving a panel assembly when an observer is at a first outer portion of a display area as illustrated in FIG. 16.
Figure 18:
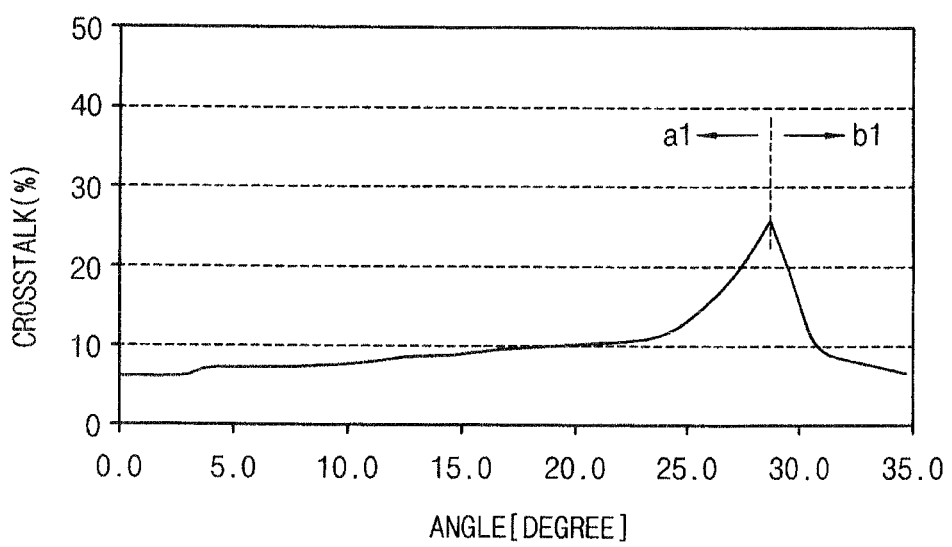
FIG. 18 is a graph diagram illustrating crosstalk values according to viewing angles of a 3D image displayed by the panel assembly in FIG. 17.

FIG. 17 is a schematic diagram illustrating a method of driving a panel assembly, when an observer is at a first outer portion of a display area as illustrated in FIG. 16. FIG. 18 is a graph diagram illustrating crosstalk values according to viewing angles of a 3D image displayed by the panel assembly in FIG. 17.

Referring to FIGS. 16 and 17, when the observer is at the first outer portion EP1, the display area DA is divided into the first left block a1 and the second left block b1 in consideration of the crosstalk according to the viewing angle of the observer.

For example, in the active barrier panel 300 corresponding to the first left block a1, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. In the display panel 200 corresponding to the first left block a1, the left-eye image L is displayed on the first and second sub pixels SP1 and SP2 and the right-eye image R is displayed on the third and fourth sub pixels SP3 and SP4.

In the active barrier panel 300 corresponding to the second left block b1, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. The left-eye and right-eye images L and R in the second left block b1 are rendered in a different order from an arranging order of the left-eye and right-eye images L and R in the first left block a1. For example, in the display panel 200 corresponding to the second left block b1, the left-eye image L is displayed on the second and third sub pixels SP2 and SP3, and the right-eye image R is displayed on the first and fourth sub pixels SP1 and SP4. The embodiments of the present invention are not limited to the above data rendering method, and may include various other data rendering methods, which allow the observer's left and right eyes to see the left-eye image and the right-eye image, respectively.

Referring to FIG. 18, crosstalk values are measured with respect to viewing angles of the observer which is at the first outer portion EP1. A crosstalk average measured in the first left block a1, which corresponds to viewing angles of less than about 27 degrees, is about 10%. A crosstalk average measured in the second left block b1, which corresponds to viewing angles of more than about 27 degrees, is about 10%.

In the case of a display apparatus of two-sub barrier structure which includes two barrier electrodes corresponding to two sub pixels, a moving crosstalk value of a 3D image may be about 25%. The moving crosstalk value is one obtained for left-eye and right-eye images viewed between the viewing positions shown in FIG. 4.

In comparison with the two-sub barrier structure, according to an exemplary embodiment, the observer which is at the first outer portion EP1 may view 3D images with decreased crosstalk.

Figure 19:
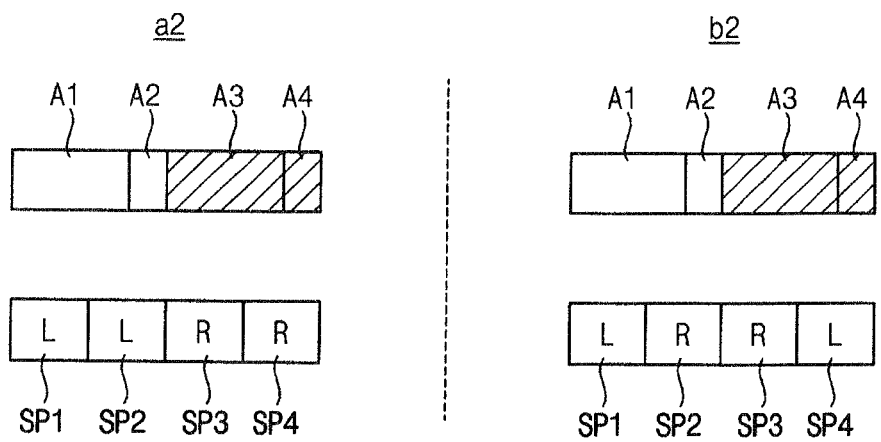
FIG. 19 is a schematic diagram illustrating a method of driving a panel assembly when an observer is at a second outer portion of a display area as illustrated in FIG. 16.

FIG. 19 is a schematic diagram illustrating a method of driving a panel assembly, when an observer is at a second outer portion of a display area as illustrated in FIG. 16.

Referring to FIGS. 16 and 19, when the observer is at the second outer portion EP2, the display area DA is divided into the first right block a2 and the second right block b2 in consideration of the crosstalk according to the viewing angle.

For example, in the active barrier panel 300 corresponding to the first right block a2, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. In the display panel 200 corresponding to the first right block a2, the left-eye image L is displayed on the first and second sub pixels SP1 and SP2 and the right-eye image R is displayed on the third and fourth sub pixels SP3 and SP4.

In the active barrier panel 300 corresponding to the second right block b2, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. The left-eye and right-eye images L and R in the second right block b2 are rendered in a different order from an arranging order of the left-eye and right-eye images L and R in the first right block a2. For example, in the display panel 200 corresponding to the second right block b2, the right-eye image R is displayed on the second and third sub pixels SP2 and SP3, and the left-eye image L is displayed on the first and fourth sub pixels SP1 and SP4. The embodiments of the present invention are not limited to the above data rendering method, and may include various other data rendering methods, which allow the observer's left and right eyes to see the left-eye image and the right-eye image, respectively.

The crosstalk values measured with respect to the viewing angles of the observer which is at the second outer portion EP2 are the same or substantially the same as the crosstalk values illustrated in FIG. 18. Therefore, the observer which is at the second outer portion EP2 sees 3D images having an average crosstalk value of about 10%.

Figure 20:
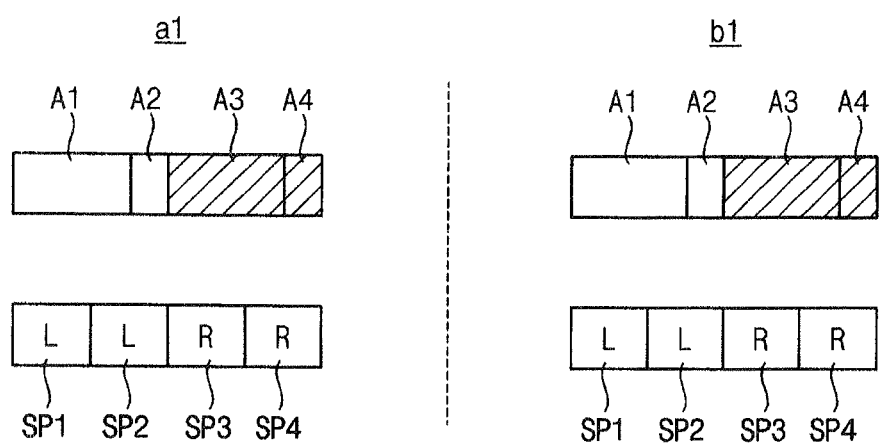
FIG. 20 is a schematic diagram illustrating a method of driving a panel assembly when an observer is at a second outer portion of a display area according to a comparative example.
Figure 21:
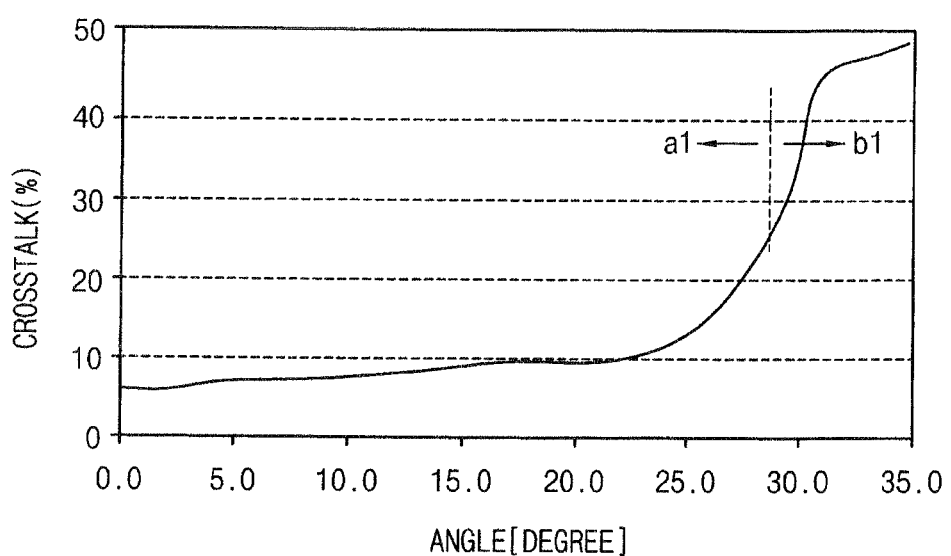
FIG. 21 is a graph diagram illustrating crosstalk values according to viewing angles of a 3D image displayed by the panel assembly in FIG. 20.

FIG. 20 is a schematic diagram illustrating a method of driving a panel assembly, when an observer is at a second outer portion of a display area according to a comparative example. FIG. 21 is a graph diagram illustrating crosstalk values according to viewing angles of a 3D image displayed by the panel assembly in FIG. 20.

Referring to FIGS. 16, 20 and 21, when the observer is at the first outer portion, the panel assembly according to the comparative example is driven without respect to the observer's viewing angles. According to the comparative example, the first left block a1 and the second left block b1 are driven by the same method.

For example, in the active barrier panel 300 corresponding to the first left block a1, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. In the display panel 200 corresponding to the first left block a1, the left-eye image L is displayed on the first and second sub pixels SP1 and SP2 and the right-eye image R is displayed on the third and fourth sub pixels SP3 and SP4.

In the active barrier panel 300 corresponding to the second left block b1, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. In the display panel 200 corresponding to the second left block b1, the left-eye image L is displayed on the first and second sub pixels SP1 and SP2 and the right-eye image R is displayed on the third and fourth sub pixels SP3 and SP4.

Referring to FIG. 21, crosstalk values are measured according to viewing angles of the observer which is at the first outer portion EP1. A crosstalk average measured in the first left block a1, which corresponds to viewing angles of less than about 27 degrees, is less than about 25%. A crosstalk average measured in the second left block b1, which corresponds to viewing angles of more than about 27 degrees, is more than about 25%.

According to the comparative example, the observer which is at the first outer portion EP1 may normally see 3D images displayed in the first left block a1 but not 3D images displayed in the second left block b1.

According to an exemplary embodiment, when the observer is at the outer portion, the display panel and the active barrier panel are driven, with the display panel and the active barrier panel divided into the plurality of blocks in consideration of crosstalk that may occur due to the viewing angle so that the display quality of the 3D image may be increased.

Figure 22:
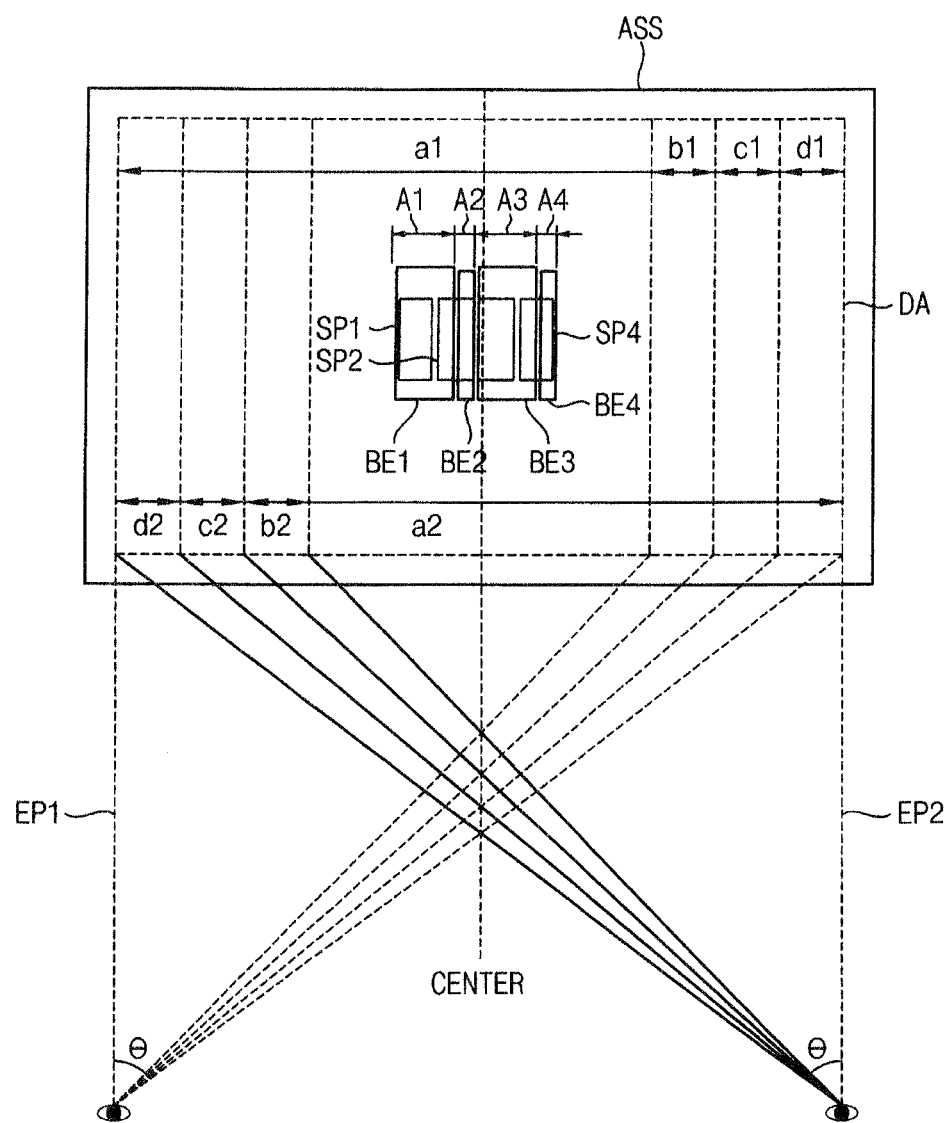
FIG. 22 is a schematic diagram illustrating a method of displaying a 3D image according to an exemplary embodiment of the invention.

FIG. 22 is a schematic diagram illustrating a method of displaying a 3D image according to an exemplary embodiment of the invention.

Referring to FIGS. 1 and 22, according to an exemplary embodiment, when the observer is at an outer portion of a display area DA substantially displaying an image in the panel assembly ASS, the display driving part 250 and the barrier driving part 350 divide the display area DA of the panel assembly ASS into first, second, third and fourth blocks and drive the display area DA of the panel assembly ASS, with the display area DA divided into the first, second, third and fourth blocks. According to an embodiment, the first, second, third and fourth blocks are divided based on crosstalk corresponding to a viewing angle of the observer.

The outer portion of the display area DA includes a first outer portion EP1 which is positioned at a left side of the outer portion and a second outer portion EP2 which is positioned at a right side of the outer portion.

When the observer is at the first outer portion EP1, the display area DA is divided into first, second, third and fourth left blocks a1, b1, c1 and d1. The sub pixels and barrier electrodes included in the first, second, third and fourth left blocks a1, b1, c1 and d1 are individually driven so that the crosstalk may be decreased. When the observer is at the second outer portion EP2, the display area DA is divided into first, second, third and fourth right blocks a2, b2, c2 and d2. The sub pixels and barrier electrodes included in the first, second, third and fourth right blocks a2, b2, c2 and d2 are individually driven so that the crosstalk may be decreased.

As such, the observer which is at the outer portion sees crosstalk-free 3D images.

Figure 23:
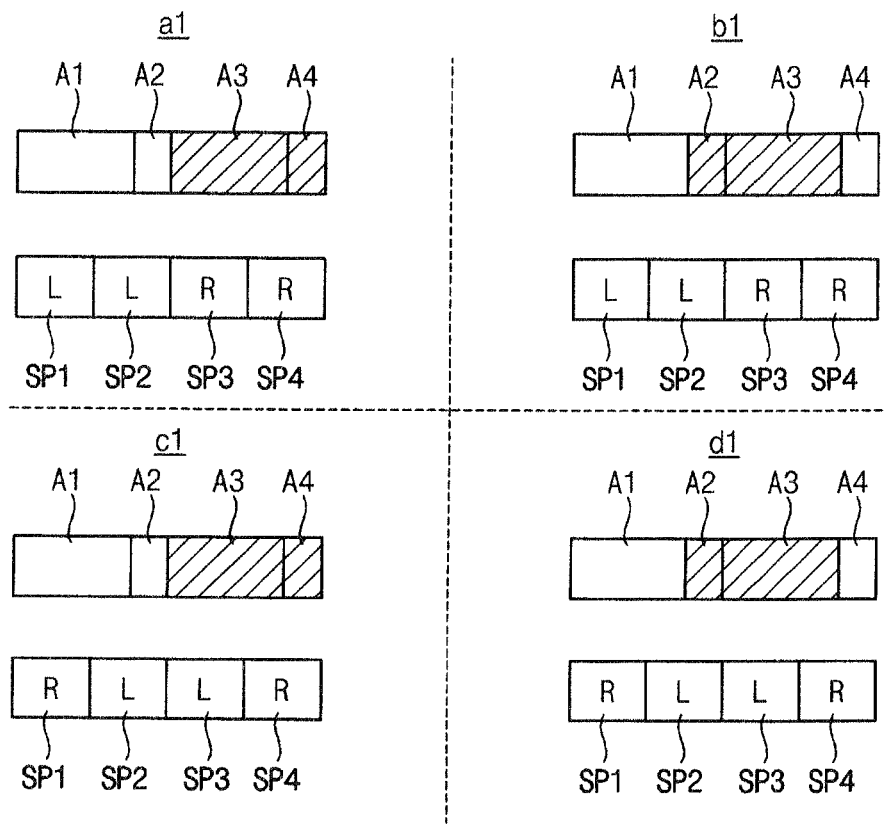
FIG. 23 is a schematic diagram illustrating a method of driving a panel assembly when an observer is at a first outer portion of a display area as illustrated in FIG. 22.
Figure 24:
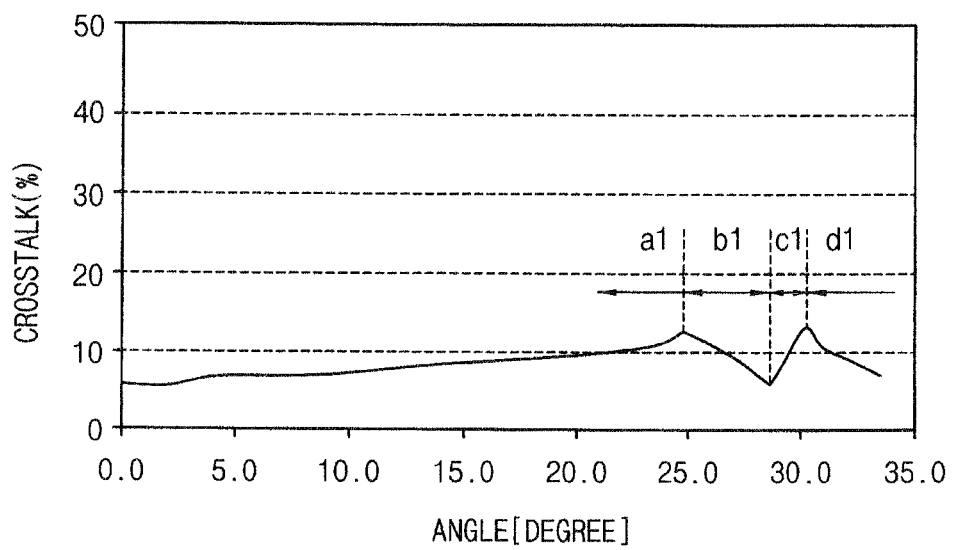
FIG. 24 is a graph diagram illustrating crosstalk values according to viewing angles of the 3D image displayed by the panel assembly in FIG. 23.

FIG. 23 is a schematic diagram illustrating a method of driving a panel assembly, when an observer is at a first outer portion of a display area as illustrated in FIG. 22. FIG. 24 is a graph diagram illustrating crosstalk values according to viewing angles of the 3D image displayed by the panel assembly in FIG. 23.

Referring to FIGS. 23 and 24, when the observer is at the first outer portion EP1, the display area DA is divided into the first, second, third and fourth left blocks a1, b1, c1 and d1 in consideration of the crosstalk according to the viewing angle.

For example, in the active barrier panel 300 corresponding to the first left block a1, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. In the display panel 200 corresponding to the first left block a1, the left-eye image L is displayed on the first and second sub pixels SP1 and SP2 and the right-eye image R is displayed on the third and fourth sub pixels SP3 and SP4.

In the active barrier panel 300 corresponding to the second left block b1, the opening part OP and the barrier part BP are shifted with respect to the opening and barrier parts of the first left block a1. The first and fourth areas A1 and A4 in which the first and fourth barrier electrodes BE1 and BE4 are disposed are driven, resulting in the opening part OP, and the second and third areas A2 and A3 in which the second and third barrier electrodes BE2 and BE3 are disposed are driven, resulting in the barrier part BP. In the display panel 200 corresponding to the second left block b1, the left-eye image L is displayed on the first and second sub pixels SP1 and SP2 and the right-eye image R is displayed on the third and fourth sub pixels SP3 and SP4.

In the active barrier panel 300 corresponding to the third left block c1, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. The left-eye and right-eye images L and R in the third left block c1 are rendered in a different order from an arranging order of the left-eye and right-eye images L and R in the first left block a1. For example, in the display panel 200 corresponding to the third left block el, the left-eye image L is displayed on the second and third sub pixels SP2 and SP3 and the right-eye image R is displayed on the first and fourth sub pixels SP1 and SP4.

In the active barrier panel 300 corresponding to the fourth left block d1, the first and fourth areas A1 and A4 in which the first and fourth barrier electrodes BE1 and BE4 are disposed are driven, resulting in the opening part OP, and the second and third areas A2 and A3 in which the second and third barrier electrodes BE2 and BE3 are disposed are driven, resulting in the barrier part BP. The left-eye and right-eye images L and R in the fourth left block d1 are rendered in a different order from an arranging order of the left-eye and right-eye images L and R in the first left block a1. For example, in the display panel 200 corresponding to the fourth left block d1, the left-eye image L is displayed on the second and third sub pixels SP2 and SP3 and the right-eye image R is displayed on the first and fourth sub pixels SP1 and SP4.

The embodiments of the present invention are not limited to the above data rendering method and may include various other data rendering methods, which allow the observer's left and right eyes to see the left-eye image and the right-eye image, respectively.

Referring to FIG. 24, crosstalk values are measured with respect to viewing angles of the observer which is at the first outer portion EP 1. A crosstalk average measured in the first left block a1, which corresponds to viewing angles of less than about 24 degrees, is less than about 12%. A crosstalk average measured in the second left block b1, which corresponds to viewing angles of about 22 degrees to about 28 degrees, is about 10%. A crosstalk average measured in the third left block c1, which corresponds to viewing angles of about 28 degrees to about 30 degrees, is about 10%. A crosstalk average measured in the fourth left block d1, which corresponds to viewing angles of more than about 30 degrees, is less than about 10%. The crosstalk average measured in the first, second, third and fourth left block a1, b1, c1 and d1 is less than about 10%.

Therefore, the observer which is at the first outer portion EP1 sees 3D images having a crosstalk value less than about 10%.

Figure 25:
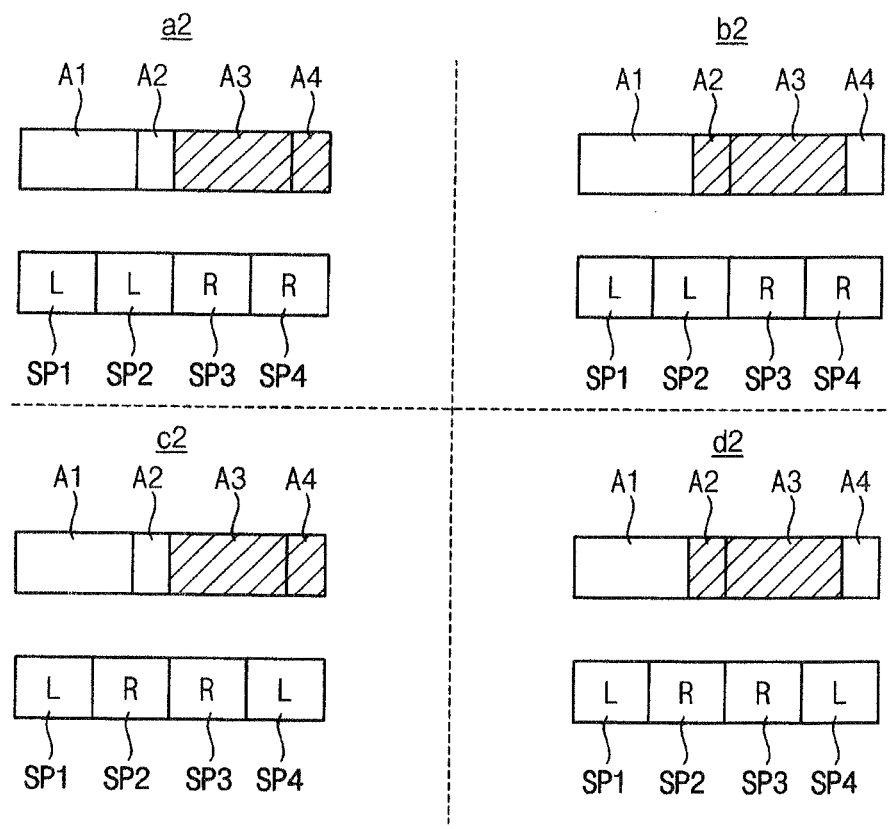
FIG. 25 is a schematic diagram illustrating a method of driving a panel assembly when an observer is at a second outer portion of a display area as illustrated in FIG. 22.

FIG. 25 is a schematic diagram illustrating a method of driving a panel assembly, when an observer is at a second outer portion of a display area as illustrated in FIG. 22.

Referring to FIGS. 22 and 25, when the observer is at the second outer portion EP2, the display area DA is divided into the first, second, third and fourth right blocks a2, b2, c2 and d2 in consideration of the crosstalk according to the viewing angle.

For example, according to an embodiment, the display panel 200 and the active barrier panel 300 corresponding to the first and second right block a2 and b2 are driven by the same method as the method described in connection with FIGS. 25 and 23.

In the active barrier panel 300 corresponding to the third right block c2, the first and second areas A1 and A2 in which the first and second barrier electrodes BE1 and BE2 are disposed are driven, resulting in the opening part OP, and the third and fourth areas A3 and A4 in which the third and fourth barrier electrodes BE3 and BE4 are disposed are driven, resulting in the barrier part BP. The left-eye and right-eye images L and R in the third right block c2 are rendered in a different order from an arranging order of the left-eye and right-eye images L and R in the first right block a2. For example, in the display panel 200 corresponding to the third right block c2, the right-eye image R is displayed on the second and third sub pixels SP2 and SP3 and the left-eye image L is displayed on the first and fourth sub pixels SP1 and SP4.

In the active barrier panel 300 corresponding to the fourth right block d2, the first and fourth areas A1 and A4 in which the first and fourth barrier electrodes BE1 and BE4 are disposed are driven, resulting in the opening part OP, and the second and third areas A2 and A3 in which the second and third barrier electrodes BE2 and BE3 are disposed are driven, resulting in the barrier part BP. The left-eye and right-eye images L and R in the fourth right block d2 are rendered in a different order from an arranging order of the left-eye and right-eye images L and R in the first right block a2. For example, in the display panel 200 corresponding to the fourth right block d2, the right-eye image R is displayed on the second and third sub pixels SP2 and SP3 and the left-eye image L is displayed on the first and fourth sub pixels SP1 and SP4.

The embodiments of the present invention are not limited to the above data rendering method and may include various other data rendering methods, which allow the observer's left and right eyes to see the left-eye image and the right-eye image, respectively.

The crosstalk values measured with respect to the viewing angles of the observer which is at the second outer portion EP2 are the same or substantially the same as the crosstalk values illustrated in FIG. 24. Therefore, the observer which is at the second outer portion EP2 sees 3D images having an average crosstalk value of less than about 10%.

Therefore, according to the present exemplary embodiments, when the observer is at the outer portion, the display panel and the active barrier panel are driven, with the display panel and the active barrier panel divided into a plurality of blocks in consideration of crosstalk that may occur due to the viewing angle so that the display quality of 3D images may be increased.

The foregoing is illustrative of the embodiments of the present invention and is not to be construed as limiting thereof. Although a few exemplary embodiments of the present invention have been described, those skilled in the art will readily appreciate that many modifications are possible in the exemplary embodiments. Accordingly, all such modifications are intended to be included within the scope of the embodiments of the present invention as defined in the claims.

What is claimed is:

1. A method of displaying a three-dimensional ("3D") image comprising:
displaying a left-eye image and a right-eye image on a display panel, the display panel including a first sub pixel, a second sub pixel, a third sub pixel and a fourth sub pixel sequentially arranged in a row direction; and
driving an active barrier panel to form an opening part configured to transmit light and a barrier part configured to block light, the active barrier panel including a first barrier electrode, a second barrier electrode, a third barrier electrode and a fourth barrier electrode, wherein the first and third barrier electrodes each have a first width, and the second and fourth barrier electrodes each have a second width different from the first width, and wherein the first and second barrier electrodes are disposed in an area corresponding to the first and second sub pixels, and the third barrier electrode and the fourth barrier electrode are disposed in an area corresponding to the third and fourth sub pixels,
wherein the first barrier electrode overlaps about a half of a first surface of the first sub pixel, the second barrier electrode overlaps a part of the first surface of the first sub pixel and all of a first surface of the second sub pixel, the third barrier electrode overlaps about a half of a first surface of the third sub pixel, the fourth barrier electrode overlaps a part of the first surface of the third sub pixel and all of a first surface of the fourth sub pixel, each of the first, second and third sub pixels has a different color from each other, the fourth sub pixel has a same color as one of the first, second and third sub pixels, and the first and second barrier electrodes or the second and third barrier electrodes are included in the opening part according to a position of an observer, wherein when the observer is at a left outer side or a right outer side of the display panel, the display panel is divided into a first block adjacent to the left outer or right outer side and at least one block adjacent to the first block, first to fourth sub pixels in the first block display the left-eye and right-eye images in a first order, first to fourth sub pixels of the at least one block display the left-eye and right-eye images in a second order different from the first order, first to fourth barrier electrodes in the first block are driven into the opening part and the barrier part based on the left-eye and right-eye images displayed on the first block, and first to fourth barrier electrodes in the at least one block are driven into the opening part and the barrier part based on the left-eye and right-eye images displayed on the at least one block.

2. The method of claim 1, further comprising:
monitoring a position of the observer;
providing a first driving signal and a second driving signal to the first to fourth barrier electrodes so that an area of the active barrier panel in which the first to fourth barrier electrodes are disposed is driven to form the opening part or the barrier part; and
rendering the left-eye and right-eye images based on positions of the opening part and the barrier part.

3. The method of claim 2, wherein the opening part and the barrier part are shifted to the row direction by about ½ or about 3/2 of a pixel period of the sub pixels.

4. The method of claim 1, wherein when the observer is at the left outer side or the right outer side of the display panel including the first block adjacent to the left outer or right outer side and a second block adjacent to the first block, first to fourth sub pixels of the second block display the left-eye and right-eye images in the second order different from the first order.

5. The method of claim 4, further comprising:
providing the same driving signals to the first to fourth barrier electrodes in the first block and first to fourth barrier electrodes in the second block,
wherein positions of an opening part and a barrier part corresponding to the first to fourth sub pixels in the first block are the same or substantially the same as positions of an opening part and a barrier part corresponding to the first to fourth sub pixels in the second block.

6. The method of claim 1, wherein when the observer is at the left outer side or right outer side of the display panel which includes the first block adjacent to the left outer or right outer side, a second block adjacent to the first block, a third block adjacent to the second block and a fourth block adjacent to the third block,
the first to fourth sub pixels in the first block display the left-eye and right-eye images in the first order, first to fourth sub pixels in the second block display the left-eye and right-eye images in the first order, first to fourth sub pixels in the third block display the left-eye and right-eye images in the second order different from the first order, and first to fourth sub pixels in the fourth block display the left-eye and right-eye images in a third order different from the first order.

7. The method of claim 6, wherein the second order is the same as the third order.

8. The method of claim 7, further comprising:
providing first driving signals to the first to fourth barrier electrodes in the first block and first to fourth barrier electrodes in the third block,
providing second driving signals different from the first driving signals to first to fourth barrier electrodes in the second block, and
providing third driving signals different from the first driving signals to first to fourth barrier electrodes in the fourth block.

9. The method of claim 8, wherein the second driving signals are the same or substantially the same as the third driving signals,
wherein positions of an opening part and a barrier part corresponding to the first to fourth sub pixels in the first block are the same or substantially the same as positions of an opening part and a barrier part corresponding to the first to fourth sub pixels in the third block, and
positions of an opening part and a barrier part corresponding to the first to fourth sub pixels in the second block are the same or substantially the same as positions of an opening part and a barrier part corresponding to the first to fourth sub pixels in the fourth block.

10. A display apparatus comprising:
a display panel displaying a left-eye image and a right-eye image including a first sub pixel, a second sub pixel, a third sub pixel and a fourth sub pixel sequentially arranged in a row direction; and
an active barrier panel including a first barrier electrode, a second barrier electrode, a third barrier electrode and a fourth barrier electrode, wherein the first and third barrier electrodes each have a first width, and the second and fourth barrier electrodes each have a second width different from the first width, and wherein the first and second barrier electrodes are disposed in an area corresponding to the first and second sub pixels, and the third barrier electrode and the fourth barrier electrode are disposed in an area corresponding to the third and fourth sub pixels, wherein the first barrier electrode overlaps about a half of a first surface of the first sub pixel, the second barrier electrode overlaps a part of the first surface of the first sub pixel and all of a first surface of the second sub pixel, the third barrier electrode overlaps about a half of a first surface of the third sub pixel, the fourth barrier electrode overlaps a part of the first surface of the third sub pixel and all of a first surface of the fourth sub pixel, each of the first, second and third sub pixels has a different color from each other, the fourth pixel has a same color as one of the first, second and third sub pixels, and the first and second barrier electrodes or the second and third barrier electrodes are included in the opening part according to a position of an observer, wherein when the observer is at a left outer side or a right outer side of the display panel, the display panel is divided into a first block adjacent to the left outer side or right outer side and at least one block adjacent to the first block, first to fourth sub pixels in the first block display the left-eye and right-eye images in a first order, first to fourth sub pixels of the at least one block display the left-eye and right-eye images in a second order different from the first order, first to fourth barrier electrodes in the first block are driven into the opening part and the barrier part based on the left-eye and right-eye images displayed on the first block, and first to fourth barrier electrodes in the at least one block are driven into the opening part and the barrier part based on the left-eye and right-eye images displayed on the at least one block.

11. The display apparatus of claim 10, wherein the first or second width is three times the second or first width.

12. The display apparatus of claim 10, wherein the active barrier panel further comprises:
a first electrode line connected to the first barrier electrode;
a second electrode line connected to the second barrier electrode;
a third electrode line connected to the third barrier electrode; and
a fourth electrode line connected to the fourth barrier electrode.

13. The display apparatus of claim 12, wherein the first and second electrode lines are respectively adjacent to first end portions of the first and second barrier electrodes, and the third and fourth electrode lines are respectively adjacent to second end portions of the third and fourth barrier electrodes, wherein the first end portions are located opposite to the second end portions.

14. The display apparatus of claim 10, further comprising:
a display driving part configured to alternately display the left-eye image and the right-eye image on two sub pixels sequentially arranged in the row direction; and
a barrier driving part configured to provide a first driving signal and a second driving signal to the active barrier panel so that an area of the barrier driving part in which the first to fourth barrier electrodes are disposed is driven to form the opening part or the barrier part.

15. The display apparatus of claim 14, further comprising a monitoring part configure to monitor a position of the observer.

16. The display apparatus of claim 15, wherein the opening part and barrier part are shifted to the row direction by about ½ or about 3/2 of a pixel period of the sub pixels.

17. The display apparatus of claim 10, wherein when the observer is at the left outer side or the right outer side of the display panel which includes the first block adjacent to the left outer or right outer side and a second block adjacent to the first block,
the display driving part displays the left-eye and right-eye images on the first to fourth sub pixels in the first block in the first order and displays the left-eye and right-eye images in the second order different from the first order.

18. The display apparatus of claim 17, wherein the barrier driving part provides the same driving signals to the first to fourth barrier electrodes in the first block and first to fourth barrier electrodes in the second block,
wherein positions of an opening part and a barrier part corresponding to the first to fourth sub pixels in the first block are the same or substantially the same as positions of an opening part and a barrier part corresponding to the first to fourth sub pixels in the second block.

19. The display apparatus of claim 10, wherein when the observer is at the left outer side or the right outer side of the display panel which includes the first block adjacent to the left outer or right outer side, a second block adjacent to the first block, a third block adjacent to the second block and a fourth block adjacent to the third block, the display driving part displays the left-eye and right-eye images on the first to fourth sub pixels in the first block in the first order, displays the left-eye and right-eye images on first to fourth sub pixels in the second block in the first order, displays the left-eye and right-eye images on first to fourth sub pixels in the third block in the second order, and displays the left-eye and right-eye images on first to fourth sub pixels in the fourth block in a third order.

20. The display apparatus of claim 19, wherein the barrier driving part provides first driving signals to first to fourth barrier electrodes in the first block and first to fourth barrier electrodes in the third block, provides second driving signals different from the first driving signals to first to fourth barrier electrodes in the second block, and provides third driving signals different from the first driving signals to first to fourth barrier electrodes in the fourth block,
wherein positions of an opening part and a barrier part corresponding to the first to fourth sub pixels in the first block are the same or substantially the same as positions of an opening part and a barrier part corresponding to the first to fourth sub pixels in the third block, and
wherein positions of an opening part and a barrier part corresponding to the first to fourth sub pixels in the second block are the same or substantially the same as positions of an opening part and a barrier part corresponding to the first to fourth sub pixels in the fourth block.

* * * * *